(12) United States Patent
Handelsman et al.

(10) Patent No.: US 12,088,106 B2
(45) Date of Patent: *Sep. 10, 2024

(54) LOAD MANAGEMENT IN HYBRID ELECTRICAL SYSTEMS

(71) Applicant: Solaredge Technologies Ltd., Herzeliya (IL)

(72) Inventors: Lior Handelsman, Givatayim (IL); Yaron Binder, Shoham (IL); Yakir Loewenstern, Ariel (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/343,310

(22) Filed: Jun. 28, 2023

(65) Prior Publication Data
US 2024/0039290 A1 Feb. 1, 2024

Related U.S. Application Data

(63) Continuation of application No. 17/391,657, filed on Aug. 2, 2021, now Pat. No. 11,728,655, which is a
(Continued)

(51) Int. Cl.
*H02J 3/38* (2006.01)
*H02J 3/00* (2006.01)
(Continued)

(52) U.S. Cl.
CPC ............. *H02J 3/381* (2013.01); *H02J 3/007* (2020.01); *H02J 3/14* (2013.01); *H02J 3/38* (2013.01);
(Continued)

(58) Field of Classification Search
CPC .... H02J 3/381; H02J 3/007; H02J 3/14; H02J 3/38; H02J 7/34; H02J 9/061; H02J 9/062; H02J 2300/20; H02J 2300/24
See application file for complete search history.

(56) References Cited

U.S. PATENT DOCUMENTS

| 6,404,075 B1 | 6/2002 | Potter et al. |
| 6,477,866 B1 | 11/2002 | Chamberlin et al. |

(Continued)

FOREIGN PATENT DOCUMENTS

| CN | 1643760 A | 7/2005 |
| CN | 102185531 A | 9/2011 |

(Continued)

OTHER PUBLICATIONS

Sep. 22, 2017—European Search Report—EP 17171962.8.
(Continued)

*Primary Examiner* — Rexford N Barnie
*Assistant Examiner* — Rasem Mourad
(74) *Attorney, Agent, or Firm* — Banner & Witcoff, Ltd.

(57) ABSTRACT

Various implementations described herein are directed to systems and methods for managing a plurality of loads connected to a plurality of power sources using a switching apparatus. Apparatuses described herein may include multi-throw switches designed for fast and efficient switching of loads. Methods described herein may include selecting one or more loads from a group of loads to connect to one or more alternative power sources, and selecting one or more loads to connect to a main (e.g. utility) electrical grid.

20 Claims, 16 Drawing Sheets

Related U.S. Application Data continuation of application No. 15/584,138, filed on May 2, 2017, now Pat. No. 11,114,855.

(60) Provisional application No. 62/340,688, filed on May 24, 2016.

(51) Int. Cl.
| | |
|---|---|
| *H02J 3/14* | (2006.01) |
| *H02J 3/46* | (2006.01) |
| *H02J 7/00* | (2006.01) |
| *H02J 7/34* | (2006.01) |
| *H02J 9/06* | (2006.01) |
| *H02M 7/44* | (2006.01) |

(52) U.S. Cl.
CPC ............ *H02J 3/466* (2020.01); *H02J 7/0068* (2013.01); *H02J 7/34* (2013.01); *H02J 9/061* (2013.01); *H02J 9/062* (2013.01); *H02M 7/44* (2013.01); *H02J 2300/20* (2020.01); *H02J 2300/24* (2020.01); *H02J 2300/28* (2020.01); *H02J 2300/30* (2020.01); *H02J 2310/14* (2020.01); *Y02B 10/10* (2013.01); *Y02B 10/70* (2013.01); *Y02B 70/30* (2013.01); *Y02B 70/3225* (2013.01); *Y02E 10/56* (2013.01); *Y02E 10/76* (2013.01); *Y04S 20/222* (2013.01); *Y04S 20/248* (2013.01)

(56) References Cited

U.S. PATENT DOCUMENTS

| | | | |
|---|---|---|---|
| 2003/0212514 A1 | 11/2003 | Koutlev et al. | |
| 2005/0128659 A1* | 6/2005 | Hibi | H02J 13/00001 |
| | | | 361/20 |
| 2005/0154499 A1* | 7/2005 | Aldridge | F02G 5/00 |
| | | | 700/286 |
| 2007/0268726 A1 | 11/2007 | Kojori et al. | |
| 2009/0027932 A1 | 1/2009 | Haines et al. | |
| 2010/0207448 A1* | 8/2010 | Cooper | H02J 3/381 |
| | | | 307/20 |
| 2011/0102052 A1 | 5/2011 | Billingsley et al. | |
| 2012/0267957 A1 | 10/2012 | Czarnecki | |
| 2013/0158735 A1 | 6/2013 | Happ et al. | |
| 2013/0187462 A1 | 7/2013 | Lim et al. | |
| 2013/0265096 A1 | 10/2013 | Gotou et al. | |
| 2013/0285448 A1 | 10/2013 | Yoshinaga | |
| 2014/0091628 A1 | 4/2014 | Thompson | |
| 2014/0252863 A1 | 9/2014 | Patel et al. | |
| 2015/0115721 A1 | 4/2015 | Norrga et al. | |
| 2015/0249336 A1 | 9/2015 | Raneri | |
| 2015/0349524 A1 | 12/2015 | Ichino et al. | |
| 2016/0211670 A1 | 7/2016 | Nakayama | |
| 2016/0226560 A1 | 8/2016 | Dent | |
| 2016/0315474 A1 | 10/2016 | Satake | |
| 2018/0013289 A1* | 1/2018 | Uenishi | H02J 3/32 |

FOREIGN PATENT DOCUMENTS

| | | |
|---|---|---|
| CN | 102751779 A | 10/2012 |
| CN | 102769302 A | 11/2012 |
| CN | 102780221 A | 11/2012 |
| WO | 2015/083373 A1 | 6/2015 |
| WO | 2016036419 A1 | 3/2016 |

OTHER PUBLICATIONS

May 22, 2019—European Office Action—EP 17171962.8.
Nov. 27, 2020—European Summons to Attend Oral Proceedings—EP 17171962.8.
Dec. 3, 2010—CN Office Action—CN201710360767.9.
Jul. 18, 2022—European Search Report—EP App. No. 22150071.3.

* cited by examiner

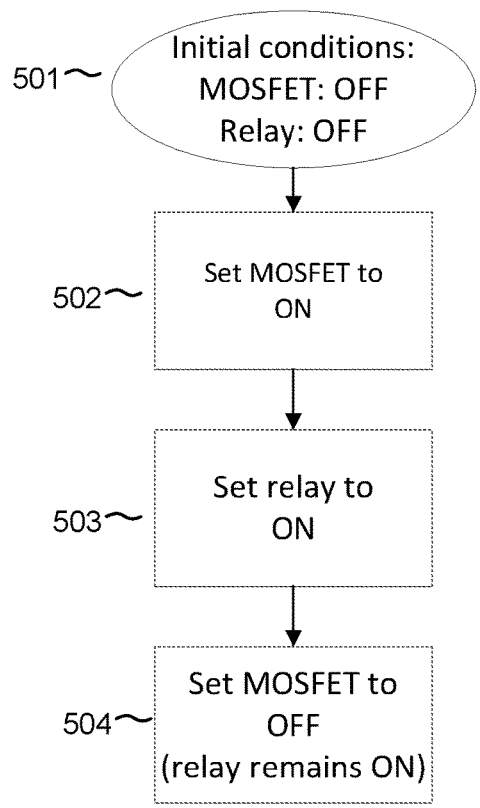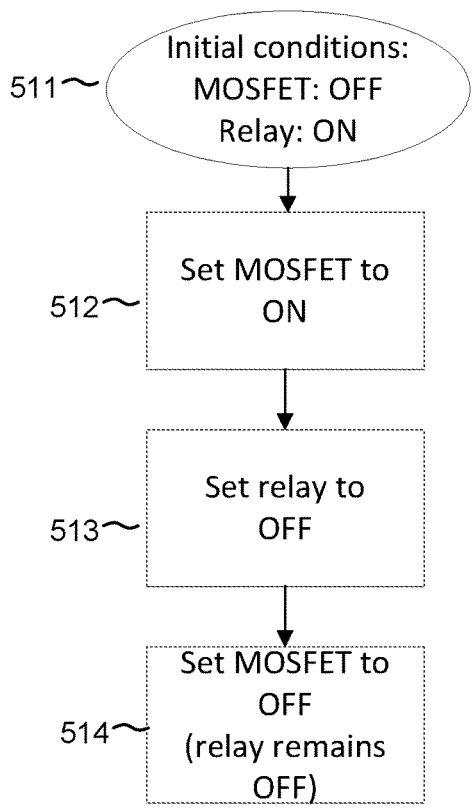
Fig. 5A  500
Fig. 5B  510

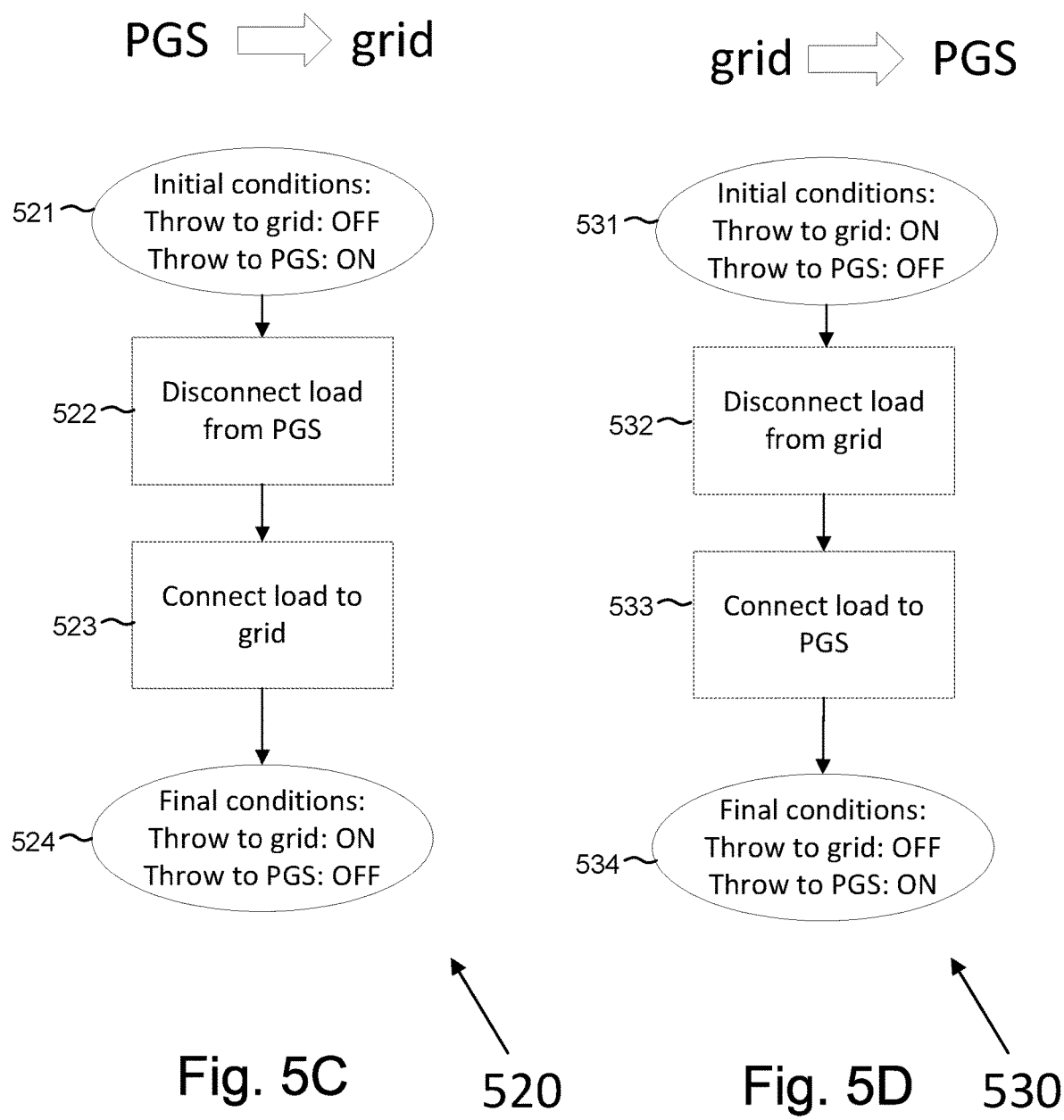

800

LOAD MANAGEMENT IN HYBRID ELECTRICAL SYSTEMS

CROSS-REFERENCE TO RELATED APPLICATIONS

The present application is a continuation of U.S. application Ser. No. 17/391,657, filed Aug. 2, 2021, which is a continuation of U.S. application Ser. No. 15/584,138, filed May 2, 2017, now U.S. Pat. No. 11,114,855, which claims the priority benefit of U.S. Provisional Patent Application No. 62/340,688, filed May 24, 2016. The patents and patent applications listed in this paragraph are hereby incorporated by reference in their entireties.

BACKGROUND

Some electrical systems may feature multiple electrical power sources and electrical loads. For example, a home may be connected to a utility electrical grid as well as to an inverter converting direct current (DC) electrical power from photovoltaic generators or batteries to alternating current (AC). The inverter, in many cases, is not connected to electrical grid. It is sometimes desirable to switch the power source connected to the load. For example, it may be desirable to power household loads from the inverter during the daytime and from the grid at night. In some scenarios, a drop in electrical power output by the inverter may require moving some loads from the inverter output to the grid. There is a need for methods and apparatuses to facilitate smooth transitions when switching loads from one power source to another.

SUMMARY

The following summary is a short summary of some of the inventive concepts for illustrative purposes only, and is not intended to limit or constrain the inventions and examples in the detailed description. One skilled in the art will recognize other novel combinations and features from the detailed description.

Embodiments herein may employ methods, systems, and apparatuses for switching electrical loads between power sources.

In illustrative embodiments comprising one or more electrical systems, a group of electrical loads may be electrically connectable to a plurality of electrical power sources. For example, a home comprising dozens of electrical appliances may be connectable to an electrical grid in addition to one or more alternative power sources (e.g. photovoltaic generator(s), battery(ies), windmill(s), fuel cell(s), flywheel(s), etc.). The alternative power sources may serve as backup power supplies, to ensure continuous supply of power to the load during a grid outage. In some embodiments, the alternative power sources may complement the grid during regular grid operation. For example, alternative power sources may supply electrical power to a load, and in case of insufficient alternative power generation (i.e. when the load requires more power than that produced by the alternative power source), compensating power may be drawn from the grid.

In some embodiments, the alternative power source may be electrically connectable to the grid. An electrical connection between the alternative power source and the grid may enable the alternative power source to feed the grid at times of excess alternative power generation (i.e. when the alternative power source is producing more power than consumed by the load). In some embodiments, the alternative power source may not be electrically connectable or connected to the grid, and excess alternative power generated by the alternative power source may be stored on energy storage devices (e.g. batteries, flywheels) or utilized to power additional loads. In some embodiments, where the alternative power source is not connected to the grid and no energy storage device is available, additional loads may be connected to the alternative power source, to increase the utilized power generated. For example, a system may be configured to turn on not-time-critical loads (e.g. washing machine, dryer, air-conditioner, electric car and/or water-boiler) at times of excess power generation by the alternative power source. In some embodiments, if no additional loads are available, the alternative power source may be limited to producing no more than the power consumed by the load.

Management of the loads connected to the alternative power source may be designed according to time-specific and location-specific policies and regulations regarding alternative power sources. For example, in some locations, local utilities may pay a feed-in tariff to local alternative power producers. The feed-in tariff may be higher than, lower than or equal to the rate charged by utilities for power drawn from the grid. In these locations, it may be profitable to connect an alternative power source to the grid when the alternative power source is producing more power than required by connected loads. In this manner, the grid may function as a load, drawing power from the alternative power source.

In some locations, local utilities might not pay a feed-in tariff, in which case the alternative power generator owner is not compensated for excess power supplied to the grid. In these locations, when an alternative power source is producing more power than that required by local loads, it may be beneficial to store the excess power on an energy storage device (e.g. a battery or flywheel) for later consumption. In one arrangement, the excess power stored on the energy storage device may later be used for self-consumption. In some cases, for example where energy storage devices are not available, excess generation may be utilized to reduce the power that local loads require at a later time, for example, to turn on air conditioners to cool a house, turn on a water boiler, charge an electric car, or turn on a dishwasher or washing machine. In another arrangement, it may be desirable to decrease the power generated by the alternative power source, to match the generation to the load requirements. For example, this may be advantageous where no additional loads or energy storage devices are available.

In some embodiments, a load may be divided into multiple smaller loads, with each load selectively connected to either an electrical grid or an alternative power source. Determining which loads to connect to an electrical grid and which loads to connect to an alternative power source may depend on local feed-in policies and may be carried out according to various methods disclosed herein. For example, in locations where the feed-in tariff is non-existent or lower than the cost of consuming power from the grid, it may be desirable to connect loads to maximize the power drawn from the alternative power source for self-consumption or for storing for later self-consumption, while not surpassing the power generated by the alternative power source. In locations where the feed-in tariff is higher than the cost of consuming power from the grid but the allowable feed-in power is limited, it may be desirable to connect loads to maximize the power fed to the grid without surpassing the allowable feed-in limit.

Various algorithmic methods may be used to connect loads to the different power sources in an optimal manner. For simplicity, the descriptions disclosed herein assume that the feed-in tariff (if one exists) is lower than the cost of drawing power from the grid, i.e. it is beneficial to maximize the power generated by alternative power source for self-consumption. It is understood that this is merely an illustrative scenario, and that the same methods may be modified by one of ordinary skill in the art to reverse the optimality criterion (i.e. maximize the power fed to the grid) and are included within the scope of the disclosure.

In some embodiments, a "brute force search" may be carried out, with the total consumption of every possible combination of loads calculated, and the group of loads corresponding to the highest total consumption which does not surpass the alternative power source generation connected to the alternative power source, and all other loads connected to the grid may be selected. In some embodiments, a brute force search may be carried out at frequent intervals, such as once-per-second, to ensure optimal usage of alternative power resources. In some embodiments, the number of loads may render a brute-force search unfeasible for frequent arrangement of load division. In these embodiments, a brute-force search may be carried out less frequently (e.g. once every five minutes). Additionally, or alternatively, in these embodiments, the brute force search may include faster heuristic methods dividing the loads between the power sources at shorter regular intervals. In some embodiments, one or more changes in generation or load levels may trigger a redistribution of loads according to optimality criteria.

Switching circuits and control thereof may be designed for rapid and efficient switching of loads between power sources according to illustrative embodiments. Some embodiments may include switching circuits comprising one or more parallel-connected switching devices. For example, an illustrative single-pole-multi-throw (SPMT) switch may be implemented using multiple parallel-connected branches. Each branch may include a transistor (e.g. MOSFET—Metal Oxide Semiconductor Field Effect Transistor, or IGBT—Insulated Gate Bipolar Transistor) in parallel to an electromechanical relay. The relay may provide low steady-state resistance and the transistor may provide a fast switching response and limit the voltage drop over the relay during switching.

In some illustrative embodiments, electrical distribution boards may include one or more integrated switching circuits for connecting one or more subsidiary circuits of the distribution board to a selected power source of one or more power sources. In some embodiments, distribution boards may be originally designed including switching circuits for connecting subsidiary circuits to different power sources. In some embodiments, a switching circuit may be retrofit to an existing distribution board to add load-switching functionality.

To facilitate smooth switching of a load from one power source to another, some embodiments may include synchronizing power source voltages to avoid providing a load with a supply voltage signal featuring discontinuities. For example, in some embodiments, a power inverter converting direct current (DC) power from a DC power source to alternating current (AC) power may be synchronized with an electrical grid and configured to output an AC voltage of the same magnitude, frequency and phase as the grid.

Further embodiments include user interfaces for monitoring load division in exemplary power systems. A system owner or operator may be able to view a list of system loads and power sources, with a mapping between each load and the power source powering it. In some embodiments, the list may be a graphical user interface (GUI) viewable on a computing device, such as a computer monitor, tablet, smart-television, smartphone, or the like. In some embodiments, the system operator may be able to manually switch loads from one power source to another through the GUI (e.g. by pressing buttons).

As noted above, this Summary is merely a summary of some of the features described herein and is provided to introduce a selection of concepts in a simplified form that are further described below in the Detailed Description. The Summary is not exhaustive, is not intended to identify key features or essential features of the claimed subject matter and is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures.

FIGS. 5A-5D are flow diagrams of methods for switching according to illustrative embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

For clarity and reduction of visual noise, many of the figures disclosed herein feature single-line electrical connections where multi-line connections would normally be used. It is to be understood that some single-line electrical connections would be implemented in some embodiments as two lines (e.g. a direct-current (DC) positive line and a direct-current (DC) negative/ground line) or three or more lines (e.g. some three-phase alternating-current (AC) systems feature three lines, and some include a fourth, "neutral" line).

Figure 1:
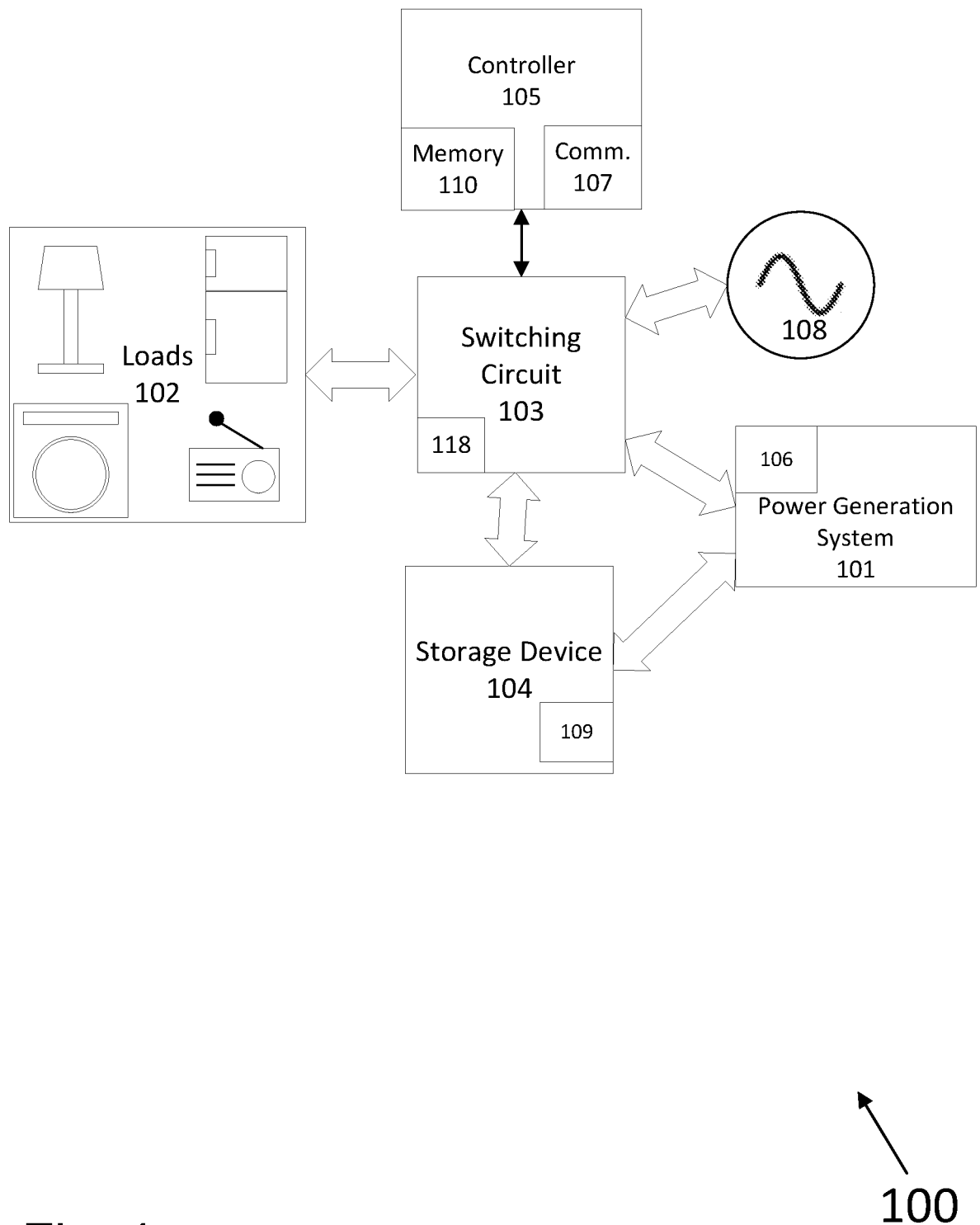
FIG. 1 is part-schematic, part block diagram of an electrical system according to illustrative embodiments.

Reference is now made to FIG. 1, which is part-schematic, part block diagram of an electrical system according to illustrative embodiments. Electrical system 100 may comprise power generation system 101, grid 108, storage device 104, switching circuit 103 and loads 102. Power generation system 101 may include one or more renewable power sources, such as photovoltaic (PV) generators (e.g. PV cells, PV modules, PV shingles etc.), windmills, hydroelectric generators etc. Grid 108 may be a utility grid providing alternating-current (AC) power. In some locales (e.g. much of Europe, Asia, Africa and the Middle East) grid 108 may provide power at a voltage of about 220V-240V RMS at a frequency of about 50 Hz, and in some locales (e.g. North America) grid 108 may provide power at a voltage of about 120V RMS at a frequency of about 60 Hz. Grid 108 may be capable of providing significantly more power than power generation system 101. Storage device 104 may comprise one or more of battery(ies), flywheel(s), pumped-storage or thermal storage devices. Loads 102 may comprise large or small machines, household appliances, lighting circuits and more.

Still referring to FIG. 1, switching circuit 103 may comprise one or more switches (e.g. transistor switches such as MOSFETs or IGBTs, and/or relays) configured to connect and disconnect some or all of loads 102 to grid 108, power generation system 101 and/or storage device 104. Switching circuit may be a single component installed on a building electrical distribution panel, or may be comprised of many small switching circuits distributed in different locations within the building. For example, some electrical outlets may include a switch for connecting the outlet to different power sources (e.g. power generation system 101, grid 108 or storage device 104).

Still referring to FIG. 1, controller 105 may control the switching of switching circuit 103. Controller 105 may comprise a control device such as a microprocessor, Digital Signal Processor (DSP), Field Programmable Gate Array (FPGA), Application Specific Integrated Circuit (ASIC), etc. In some embodiments, controller 105 may include or be coupled to sensors/sensor interfaces and/or measurement devices, such as voltage, current and/or power sensors. The measurement devices, sensors, or sensor interfaces may supply the controller 105 with information regarding current operation of power generation system 101 or of one or more components of power generation system 101. For example, the measurement devices, sensors, or sensor interfaces may provide information to controller 105 indicative of the power generated by power generating system 101, the power consumed by loads 102, the ambient temperature and/or the energy stored on storage device 104, or the like. Controller 105 may further comprise memory device 110 for storing operational data such as load indexes, load magnitudes, code to be run by the controller 105 and more. Memory device 110 may be any kind of memory device that has sufficient processing capacity for real-time applications (e.g. flash, Electrically Erasable Programmable Read-Only Memory (EEPROM), Random Access Memory (RAM), Solid State Devices (SSD) or other memory devices).

In some embodiments, controller 105 may by physically located adjacently to switching circuit 103, and may directly supply control signals to the switching components of switching circuit 103. For example, controller 105 may directly apply a voltage signal to a terminal of a switching element of switching circuit 103. In some embodiments, one or more communication devices may communicatively interconnect one or more system components. For example, controller 105 may be remotely located (e.g. a remote server, or as a cloud software service), and may comprise communication device 107. Communication device 107 may be configured to communicate with communication device 118, with communication device 118 including a control system or controller for controlling the switching of switching circuit 103. Power generation system 101 may include communication device 106. Communication device 106 may be configured to communicate with communication device 107 and/or communication device 118. For example, communication device 106 may report current levels of power production to communication device 107 and/or communication device 118. In some embodiments, storage device 104 may include communication device 109. Communication device 109 may include a controller for configuring the mode of operation of storage device 104 (e.g. charging, discharging, or neither). Communication device 109 may communicate information regarding the status of storage device 104 (e.g. the current mode of operation of storage device 104 and the currently stored energy level of storage device 104).

Still referring to FIG. 1, communication devices 106, 107, 118 and/or 109 may be variously implemented. For example, communication devices 106, 118 and/or 109 may communicate over power lines, using Power Line Communication (PLC) methods and/or acoustic communication methods. In some embodiments, communication devices 106, 107, 118 and/or 109 may comprise wireless transceivers, and may communicate using wireless technologies and protocols, such as ZigBee™, Wi-Fi, Bluetooth™, and/or cellular networks.

Figure 2:
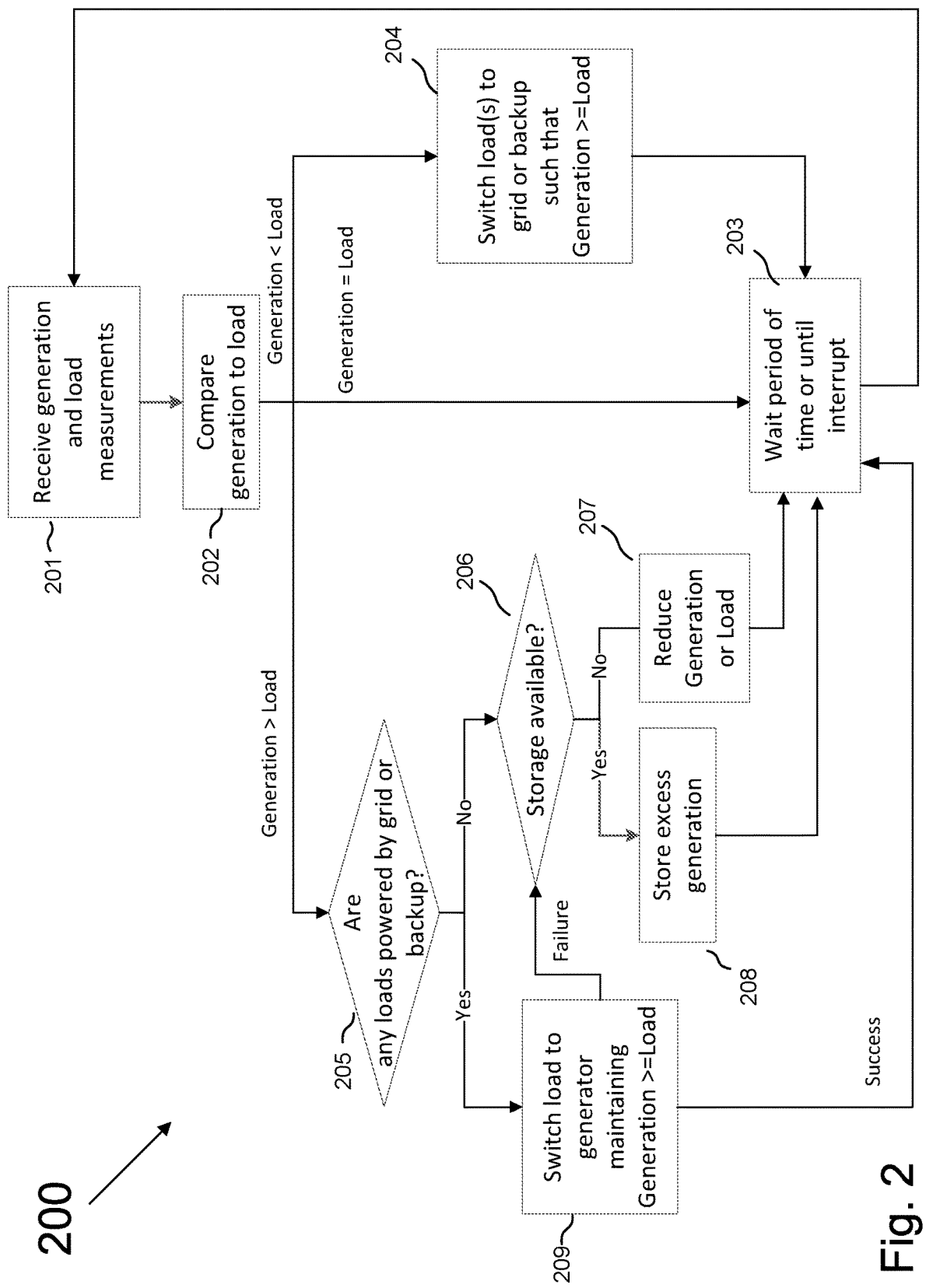
FIG. 2 is a flow diagram of a method for load management in an electrical system according to illustrative embodiments.

Reference is now made to FIG. 2, which shows a flow diagram of a method for load management in an electrical system according to illustrative embodiments. Conventional load management methods consider the problem of selecting a group of loads to provide with power at times where current power resources may be insufficient to power all loads connected to a power source. Methods disclosed herein may include but are not limited to scenarios where a utility grid is able to supply all loads with required power, but it may be beneficial to the system manager to minimize the power drawn from the grid by maximizing the power drawn and utilized from an alternative power source (e.g. in locales where the alternative power source may not inject power to the grid, or the feed-in tariff is lower than the cost of drawing power from the grid).

Efficient management of loads connectable to multiple power sources may enable decoupling of the power sources and decrease the costs associated with system implementation. For example, a grid-tied photovoltaic (PV) inverter must comply with various safety standards and regulations. Furthermore, installing a grid-tied PV inverter may require approval by local utilities, a process which may delay system installation by months. By providing effective management of loads connectable to a PV inverter and the grid, implementation of method 200 may increase the financial feasibility of installing of a PV inverter which is not necessarily tied to the grid, thereby possibly allowing a cheaper PV inverter to be used (e.g. an inverter which might not be designed to comply with all grid-tied inverter requirements), and reduce the time required to obtain utility permits for installation of a PV system.

Method 200 may be carried out by a device or a controller, such as controller 105 of FIG. 1. At step 201, the controller or device may receive one or more measurements of power generation and current load levels. For example, the controller or device may receive power produced by a generator (such as power generation system 101 of FIG. 1) and an amount of power consumed by a group of one or more loads (such as loads 102 of FIG. 1). The measurements may be directly measured by sensors/sensor interfaces or devices included in the controller (e.g. controller 105 of FIG. 1), or may be provided to the controller or device via one or more communication device (e.g. communication devices 106, 107, 118 and 109 of FIG. 1). At step 202, the controller or device may compare the power generation measurements to the current load level measurements.

As a result of comparing the power generation measurements to the current load level measurements, the controller or device may determine that the amount of generated power is greater than the current load level (shown as generation>load), that the amount of generated power is equal to the current load level (shown as generation=load), or that the amount of generated power is less than the current load level (shown as generation<load). In theory, a power system can operate under the condition load=generation indefinitely. In practical electrical supply systems, it is generally desirable to maintain the operational load<generation condition, with a system-defined excess generation margin (e.g. load≤generation+ε, where ε is the required excess generation margin). Such a mode of operation may allow continuous supply to the load even in case of a sudden reduction in generation or a sudden increase in load.

For simplicity's sake, it will be assumed when describing illustrative methods disclosed herein that the load=generation condition is an acceptable condition for continuous system operation, with no excess generation margin required. It is understood that one of ordinary skill in the art can slightly modify methods disclosed herein to incorporate requirements for excess generation margins. For example, instead of accepting the condition load=generation for sustainable system operation, the system may require the condition load≤generation−ε for some system-defined ε). Such modified methods are within the scope of the embodiments disclosed herein.

Returning to FIG. 2, processing may proceed to one of several different steps depending on the result of the comparison of step 202. If the result load=generation is obtained at step 202 (that is, if the amount of generated power is equal to the current load level), the system may be operating at a point which does not require corrective action, and the controller or device may proceed to step 203. At step 203, the controller or device may wait a period of time before looping back to step 201. In some embodiments, the controller may remain at step 203 until an interrupt is received. In one example, a received interrupt may comprise a change in load and/or generation measurements. If an interrupt is received at step 203, processing may loop back to step 201. In some embodiments, the controller or device carrying out method 200 may engage in other tasks or computations while waiting in step 203. For example, the controller or device may execute the method of FIG. 9A (discussed in detail below) for several generation and/or load levels which may be indicative or predictive of future generation and/or load levels.

If the result load>generation is obtained at step 202 (that is, if the current load level is greater than the amount of generated power), it may indicate a condition in which a generator (e.g. power generation system 101 of FIG. 1) is unable to power all the loads currently connected to it. It may be desirable to switch one or more loads from the generator to a different power source, such as a backup storage device (e.g. storage device 104 of FIG. 1) or the grid (e.g. grid 108 of FIG. 1). Accordingly, if the current load level is greater than the amount of generated power), processing may proceed to step 204. At step 204, the connections between the various loads, the generator, and the grid may be reconfigured. Reconfiguration of the connections may comprise determining which loads should be disconnected from the generator. Reconfiguration of the connections may further comprise determining which of the disconnected loads should be connected to the grid and which of the disconnected loads should be connected to a backup device. In some embodiments, step 204 may include switching one or more loads from the generator to the grid, and then switching one or more different loads from the grid to the generator, to reach a preferred operating condition. In one arrangement, a preferred operating condition may be maximization of the utilization of the generator output without surpassing the power producing capacity of the generator).

In one scenario, a first load and a second load may currently be connected to a generator, and a third load and a fourth load may currently be connected to a grid. At step 202, the controller or device may have determined that the current load level is greater than the amount of generated power. Processing may have proceeded to step 204, where the controller or device may analyze the connections between the loads and the generator and/or grid. In a first example, the controller or device may determine that maximal utilization of the generator output may be achieved if the third and fourth loads are connected to the generator and the first and second loads are connected to the grid. Accordingly, reconfiguration of the connections at step 204 in the first example may include switching the connections of the first and second loads from the generator to the grid, and switching the connections of the third and fourth loads from the grid to the generator, to reach a preferred operating condition. In a second example, the controller or device may determine that maximal utilization of the generator output may be achieved if the third load is reconfigured to connect to the generator and the first and second loads are reconfigured to be connected to the grid (while the fourth load retains its connection to the generator). Accordingly, reconfiguration of the connections at step 204 in the second example may include switching the connection of the third load from the generator to the grid and switching the connection of the first and second loads from the grid to the generator, to reach a preferred operating condition The selection of which load(s) to switch from the generator to the grid/backup device, and vice versa, may be carried out using a myriad of methods, some of which are disclosed herein (e.g. the method of FIG. 9A and method 980 of FIG. 9B).

Figure 7A:
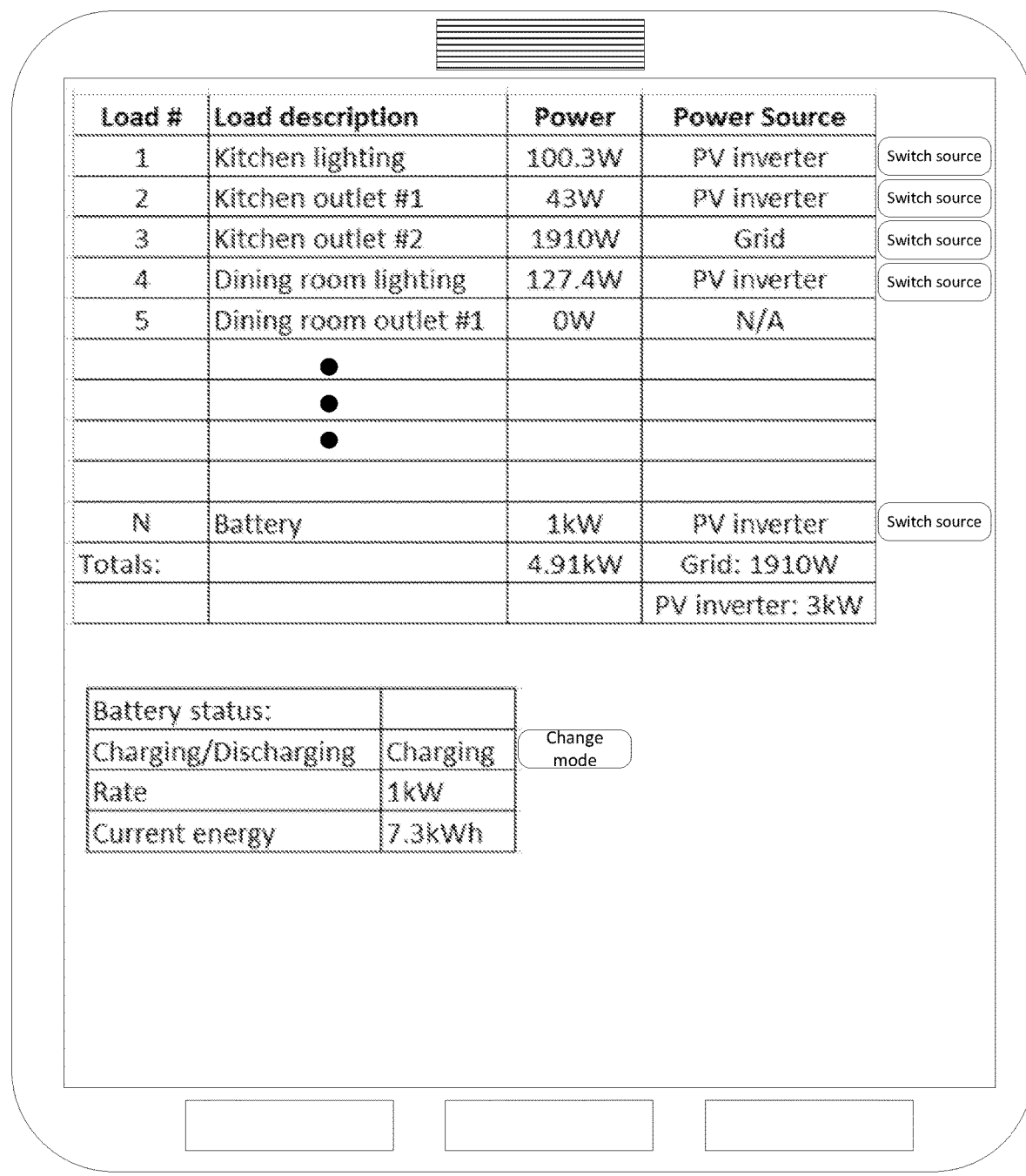
FIGS. 7A-7B are illustrative mockups of a user interface for an electrical system according to illustrative embodiments.
Figure 7B:
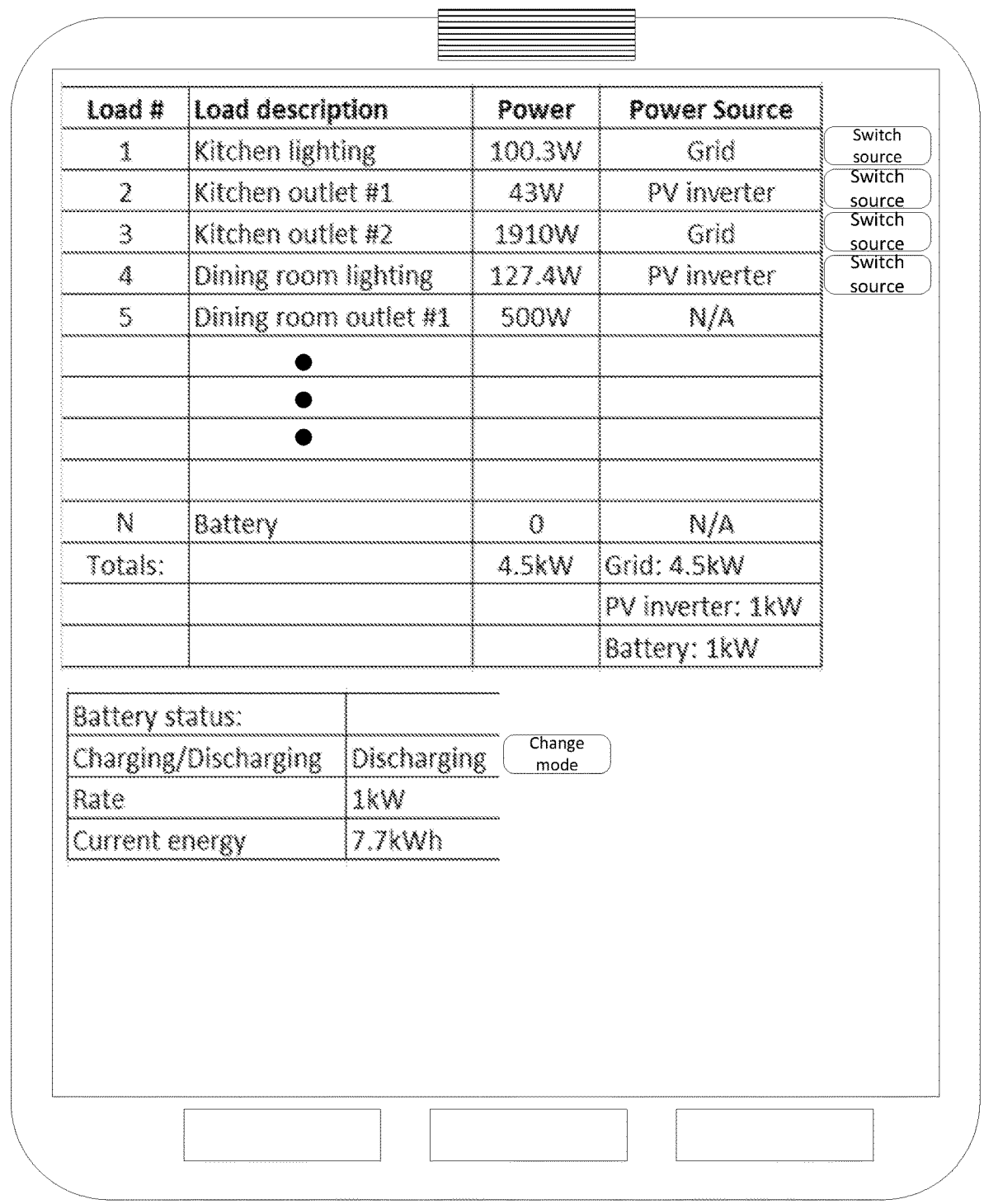

In some embodiments, the controller or device executing method 200 may have access to a list detailing system loads. Each load entry may indicate the power source powering that load and the current power consumed by that load. A graphical example of such a list is illustrated in FIGS. 7A and 7B (discussed in detail below). The list may be stored in a memory device similar to or the same as memory device 110 of FIG. 1 (e.g. flash, Electrically Erasable Programmable Read-Only Memory (EEPROM), Random Access Memory (RAM), Solid State Devices (SSD) or other memory devices), and may be read and edited by the controller. For example, after the controller switches the connections of one or more loads in step 204, the controller may update the list to reflect the updated connections.

After step 204, processing may return to step 202, where power generation measurements are again compared to the current load level measurements. In some embodiments, step 204 may be reached several times in succession following step 202 (i.e. the method jumps between steps 202 and 204 in succession), each time one or more loads being switched to the grid or a backup device. In some embodiments, implementation of step 204 may ensure that at the end of step 204 the current generator-connected load is smaller than or equal to the amount of generated power, and processing may continue at step 203 or step 205 (these variations not explicitly depicted in the flow chart).

If the result load<generation is obtained at step 202 (that is, if the current load level is less than the amount of generated power), it may indicate a condition in which a generator (e.g. power generation system 101 of FIG. 1) is generating more power than is required by the loads connected to it. In this condition, it may be desirable for the system to reach a new operating condition which makes better use of the power-generating capacity of the generator. Accordingly, processing may proceed to step 205, where the controller or device may determine if any loads (e.g. one or more loads of loads 102 of FIG. 1) are connected to the grid (e.g. grid 108) and/or a backup device (e.g. storage device 104). The controller or device may determine whether any loads are connected to a grid and/or a backup device based on the detailed list of loads (described above with reference to step 201). If it is determined, at step 205, that one or more loads are connected to the grid or a backup device, processing may proceed to step 209. At step 209, the device or controller may switch one or more selected loads from the grid and/or backup device to the generator. The selection of the one or more loads to switch to the generator may be carried out using a myriad of methods, some of which are disclosed herein (e.g. the method of FIG. 9A and method 940 of FIG. 9C).

If the device or controller successfully selects one or more loads to switch to the generator at step 209, processing may proceed to step 203. If the device or controller is unable to select one or more loads for switching to the generator at step 209 the method may proceed to step 206. For example, the device or controller may be unable to select one or more loads for switching to the generator if switching any single load from the grid/backup device to the generator would result in an unacceptable load>generation condition (i.e. if switching the single load would result in the current load level being greater than the generated power). At step 206, the device or controller may determine if a storage device is available. If a storage device is available (e.g. a storage device similar to or the same as storage device 104 of FIG. 1), the method may proceed to step 208. At step 208, the device or controller may connect the storage device to the generator. For example, controller 105 of FIG. 1 may configure switching circuit 103 to connect storage device 104 to power generation system 101. Subsequent to this configuration, power generation system 101 may store excess power in storage device 104. Processing may then return to step 203, discussed above.

If no storage device is available at step 206, the method may proceed to step 207, where the device or controller may either add a load to be powered by the generator or reduce the power generated by the generator. A storage device may not be available if the system does not include a storage device, or if all storage devices are already maximally utilized. The controller or device may be configured to connect certain loads to the generator in case of excess generation with no available storage. For example, the device or controller may connect an air conditioning system to the generator to reduce the temperature of a home during summer, heat water in a water boiler or turn on a washing machine or dishwasher, which may reduce power consumption later on (since in many cases these devices would otherwise be turned on later, when there might not be available excess power generated by the generator). If no loads are configured to be turned on in case of excess power generation, at step 207, the device or controller may reduce the power generated by the generator. For example, if method 200 is applied to a system where the generator includes a photovoltaic (PV) generator coupled to active power electronics (e.g. one or more DC-DC converters and/or one or more DC-AC inverters) configured to control the power output by the PV generator, the device or controller may configure the active power electronics to reduce the power drawn from the PV generator, such that it matches the current load level. From step 207, the method may proceed to step 203.

Figure 3:
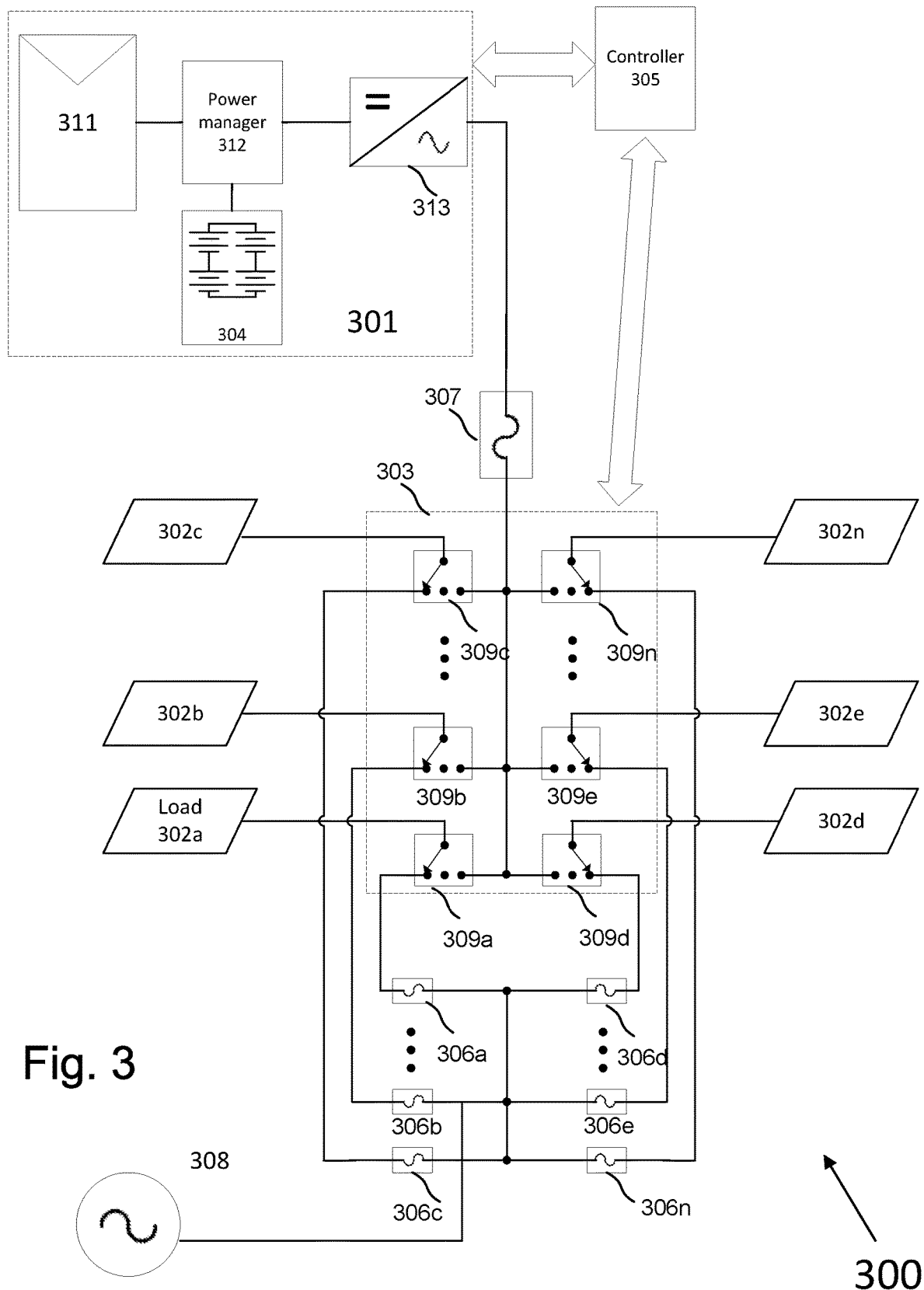
FIG. 3 is a part-schematic, part block diagram of an electrical system according to illustrative embodiments.

Reference is now made to FIG. 3, which is a part-schematic, part block diagram of an electrical system according to illustrative embodiments. Electrical system 300 may comprise power generation system 301, grid 308, switching circuit 303, controller 305 and loads 302a, 302b . . . 302n. Grid 108 may be similar to or the same as grid 108 of FIG. 1. Loads 302a, 302b . . . 302n may be collectively referred to as "loads 302" and may be similar to or the same as load 102 of FIG. 1.

Still referring to FIG. 3, power generation system 301 may be similar to or the same as power generation system 101 of FIG. 1. In the illustrative example of FIG. 3, power generation system 301 comprises photovoltaic (PV) source 311, power manager 312, storage device 304 and inverter 313. PV source 311 may comprise a PV generator (e.g. PV panels, cells or shingles) one or more strings of series-connected PV generators. In some embodiments, PV source 311 may comprise one or more PV generators, which may be divided into groups of one or more PV generators, with a direct-current to direct-current (DC/DC) converter (e.g. a Buck, Boost, Buck-Boost, Buck+Boost, Flyback, Cuk or Forward converter, or a charge pump) coupled to each group. The DC/DC converter coupled to each group may be configured to control the power drawn from each group. For example, the DC/DC converters may increase or decrease the power drawn from each group of PV generators. Power manager 312 may comprise one or more switches, and may be configured to direct the power from PV source 311 to inverter 313 (which may be a direct-current to alternating-current (DC/AC)) and/or to storage device 304. Storage device 304 may be similar to or the same as storage device 104 of FIG. 1. In the illustrative embodiment of FIG. 3, the storage device 304 is connectable (via power manager 312) to inverter 313 via power manager 312. In some embodiments, storage device 304 may be directly connectable to loads 302, similar to the illustrative embodiment of FIG. 1. Inverter 313 may be configured to convert direct-current (DC) power received from PV source 311 and/or storage device 304 to alternating-current (AC) power suitable for powering loads 302. In some embodiments, multiple storage devices may be used, with one or more storage devices directly connectable to loads (e.g. the arrangement illustrated in FIG. 1) and one or more storage device not directly connected to loads (e.g. the arrangement of FIG. 3).

Still referring to FIG. 3, circuit breaker 307 may couple (e.g. connect) power generation system 301 to switching circuit 303. Circuit breaker 307 may be configured to disconnect power generation system 301 from switching circuit 303 in the event of a potential safety hazard, such as detection of a leakage current. For example, a leakage current may be detected if the current leaving power generation system 301 in the direction of switching circuit 303 is not equal to the current returning in the direction of power generation system 301. In some embodiments, circuit breaker 307 may be replaced by a plurality of circuit breakers deployed similarly to circuit breakers 306a, 306b . . . 306n (discussed below). Each circuit breaker of the plurality of circuit breakers may be configured to disconnect a single load of loads 302 from switching circuit 303.

Still referring to FIG. 3, power generation system 301, controller 305 and switching circuit 303 may include communication devices similar to or the same as communication devices 106, 107 and 118 of FIG. 1. The communication devices may be configured to communicate with one another similarly to the manner described with regard to FIG. 1. For brevity, the communication devices have not been explicitly depicted and described with regard to FIG. 3.

Circuit breakers 306a, 306b . . . 306n may be collectively referred to as "circuit breakers 306." Circuit breakers 306 may couple (e.g. connect) grid 308 to switching circuit 303. The circuit breakers may automatically disconnect one or more loads of loads 302 from grid 308 in the event of a potentially unsafe condition, for example detection of leakage current. Leakage current may be detected if the current from grid 308 in the direction of a load of loads 302 is not equal to the current returning in the direction of grid 308.

Still referring to FIG. 3, circuit breakers 306, switching circuit 303 and circuit breaker 307 may be deployed on an electrical distribution board located on a premises housing loads 302. One of the potential advantages of integrating alternative power sources (such as power generation system 301) according to the illustrative embodiment of FIG. 3 is the seamless integration of a switching device such as switching circuit 303. By installing switching circuit 303 serially in-between circuit breakers 306 and loads 302, from the "grid perspective" (i.e. the perspective of the utility operating grid 308) the electrical connection to the premises distribution board and the electrical interface between the premises distribution board and the grid may not have changed at all. By installing generation system 301 in a manner which does not significantly change the "grid perspective," the process of applying for and receiving safety clearance from utilities and regulatory bodies may be faster and simpler than in case of an installation which might change the interface between the grid and a premises distribution board.

Switching circuit 303 may comprise switches 309a, 309b . . . 309n, which may be collectively referred to as "switches 309". Each switch of switches 309 may enable a load of loads 302 to be connected to one or more power sources. For example, in the illustrative embodiment of FIG. 3 (featuring single-line electrical connections), switch 309a may be a single-pole triple-throw switch connected to load 302a on one end (single pole), and connectable on the other end to grid 308 (via circuit breaker 306a) or power generation system 301 (via circuit breaker 307), or no power source at all. In embodiments including a storage device directly connectable to loads (e.g. storage device 104 connectable to loads 102 via switching circuit 103) of FIG. 1, an additional throw may be added to each switch of switches 309, enabling each switch to also connect its corresponding load to the storage device. Switches 309 are illustrated in FIG. 3 as having a single pole, since the electrical connections of FIG. 3 are indicated by single lines. In systems requiring connecting and disconnecting two or more lines (e.g. positive and negative DC lines), double-pole, triple-pole or multi-pole switches may be used instead.

In some embodiments, switches 309 may be packaged and deployed as discrete components. For example, each switch of switches 309 may be enclosed in its own enclosure and be individually connected between a load of loads 302 and a circuit breaker of breakers 306. In some embodiments, a plurality of switches 309 may be packaged together forming switching circuit 303, with switching circuit 303 packaged as a single component and featuring one enclosure. In some embodiments, switching circuit 303 may designed to enable retrofitting to an existing distribution board (e.g. by connecting switching circuit 303 between circuit breakers 306 and loads 302).

Switching circuit 303 may further comprise measuring devices (not depicted explicitly for reduction of visual noise) for measuring the voltage, current and/or power supplied to each load of loads 302. In some embodiments, the voltage supplied to each load of loads 302 may be about the same (e.g. grid voltage, or the voltage supplied by power generation system 301), requiring only current measurements to enable calculation of the power drawn by each load. In some embodiments, a single measuring device may measure the total voltage, current and/or power supplied to loads 302 connected to power generation system 301, with calculation of the power drawn by each load of loads 302 enabled by temporarily disconnecting each load and subtracting the new power measurement from the total power measurement. As a numeric example, if the total power consumed by loads connected to power generation system 301 is 1000[W], and the power consumed by load 302a (which is connected to power generation system 301) is 100[W], switching circuit 303 may measure a total of 1000[W] when all loads are connected, temporality disconnect load 302a, measure 900 [W] and calculate that the power consumed by load 302a is 1000[W]−900[W]=100[W]. Switching circuit 303 may further comprise a communication device (not explicitly depicted) for sending measurements to controller 305 and/or receiving switching commands from controller 305.

Controller 305 may be similar to or the same as controller 105 of FIG. 1, and may be configured to control the switching of switching circuit 303 according to method described herein (e.g. method 200 of FIG. 2). Controller 305 may further comprise a communication device (not explicitly depicted) for receiving measurements from and sending commands to switching circuit 303 and/or power generation system 301.

Figure 4:
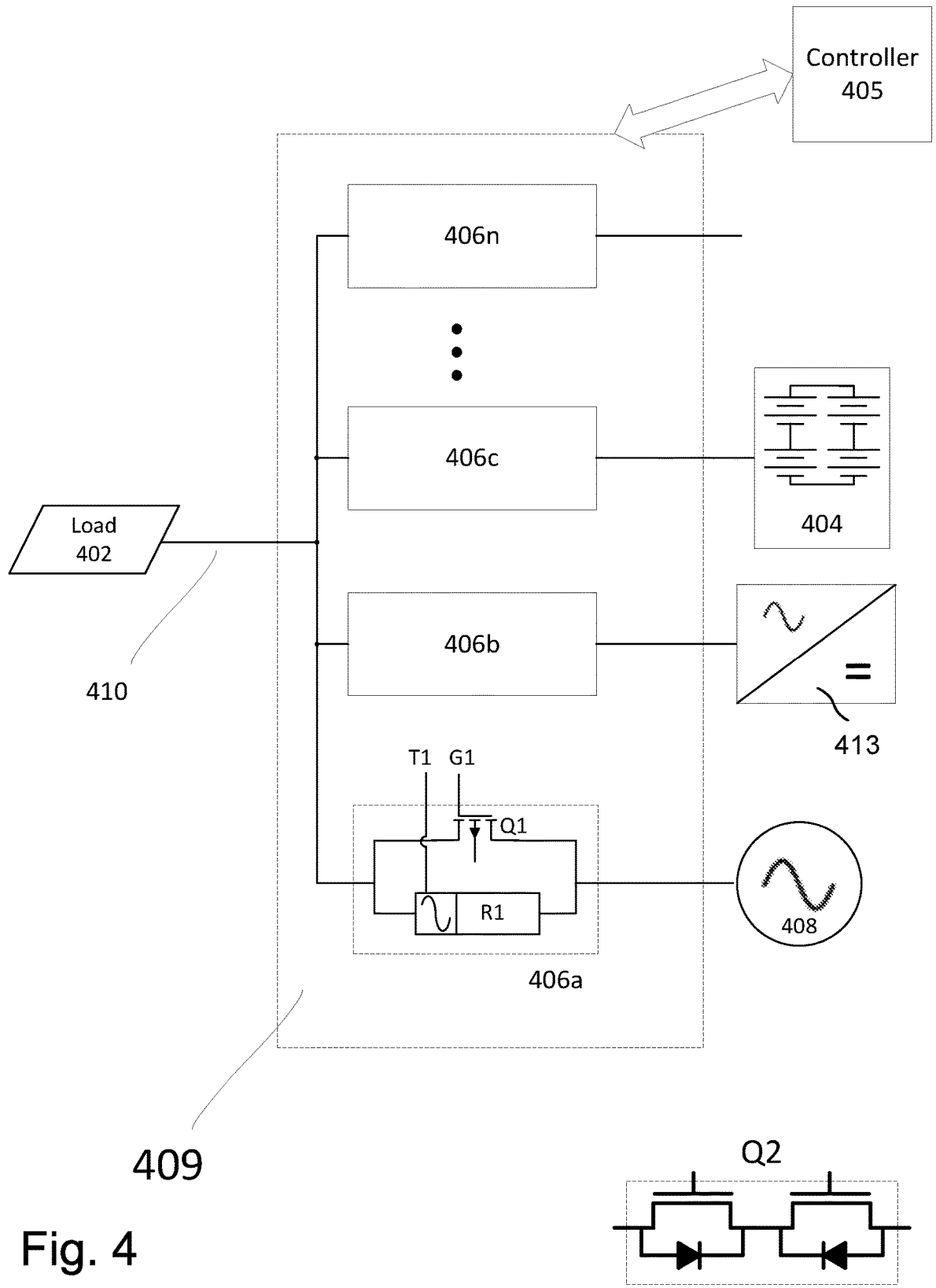
FIG. 4 is a part-schematic, part block diagram of part of a load-switching circuit according to illustrative embodiments.

Reference is now made to FIG. 4, which illustrates part of a load-switching circuit according to illustrative embodiments. The load-switching circuit may comprise switch 409. Switch 409 may comprise pole 410 connected to load 402. Load 402 may be similar to or the same as any of loads 302 of FIG. 3. Switch 409 may further comprise a plurality of throws 406a, 406b . . . 406n, referred to collectively as "throws 406", with each individual, non-specific throw of throws 406a, 406b . . . 406n referred to as "throw 406". Each throw of throws 406 may be coupled (e.g. connected) to load 402 on one end via pole 410, and may be coupled to a power source on the other end. In some embodiments, one or more of throws 406 might not be coupled to a power source (e.g. a generic n-throw switch may be deployed in a system where the number of connectable power sources is less than the number of throws comprising the switch). Each throw of throws 406 may be switched to the ON position to connect load 402 to the power source coupled to the throw. For example, when throw 406a is in the ON position, load 402 may be connected to grid 408. When throw 406b is in the ON position, load 402 may be connected to inverter 413, which may be part of a power generation system similar to or the same as power generation system 301 of FIG. 3. When throw 406c is in the ON position, load 402 may be connected to storage device 404, which may be similar to or the same as storage devices described with regard to storage device 104 of FIG. 1. When throw 406n is in the ON position, load 402 might not be connected to any power source.

Each throw 406 may comprise one or more switching elements. For example, each throw 406 may comprise transistor coupled in parallel to an electromechanical relay. Referring to throw 406a, throw 406a may comprise electromechanical relay R1 coupled in parallel with transistor Q1. In general, electromechanical relays may have lower conducting resistance and lower losses than transistors, but electromechanical relays may be sensitive to high-voltage switching (e.g. constant switching with a significant voltage drop between the relay terminals may stress the relay and shorten the lifetime of the relay). In some embodiments, connecting an electromechanical relay and a transistor in parallel and switching them in an efficient manner (e.g. according to the methods of FIGS. 5A and 5B, discussed below) may reduce switching losses and prolong the life of the switching elements.

As an example, in electrical distribution boards that may feature a switch similar to 409, it may be desirable to use MOSFETs electromechanical relays rated to withstand an open-circuit voltage of about 600V. MOSFETs with a 600V-rating may have an "ON-state resistance" ($R_{ON}$) of about 15 m$\Omega$-100 m$\Omega$, with a 15 m$\Omega$ MOSFET costing about $5, and a 100 m$\Omega$/MOSFET costing $1. In contrast, a 600V-rated electromechanical relay may have an $R_{ON}$ of about 1 mil-2 m$\Omega$, and may cost about $0.5. A large load (e.g. load 402) connected to switch 409 may draw a current of at least 15 A, leading to losses which are at least $P_{loss}=I_{RMS}^2 \cdot R_{ON}=15^2 \cdot 15e-3=3.375$ W. To obtain $R_{ON}=1.5$ m$\Omega$, ten 15 m$\Omega$ MOSFETs may be coupled in parallel, at a total cost of about $50 per throw. In contrast, a single relay of resistance 1.5 m$\Omega$ may be obtained for about $0.5, and in parallel with a cheap MOSFET (e.g. a MOSFET with $R_{ON}=100$ m$\Omega$, costing about $1) an equivalent resistance of 1.5 m$\Omega$ may be obtained for a total price of $1.5 per throw, or less than 1/30-th of the price of the MOSFET-only solution. It is to be understood that the prices and standard component properties discussed above merely reflect a potentially reasonable scenario at the time of writing. Developments in component technology and/or changes in price may change some or all of the example numbers cited above. The numerical example is used to merely illustrate one possible scenario where the benefits of embodiments disclosed herein may be realized, and is not to be limiting of any part of the disclosure. In some embodiments, a single switching element (e.g. transistor or relay) may be used for each throw 406, without obtaining all of the potential benefits of combining switching elements.

In some embodiments, transistor Q1 may be replaced by a plurality of transistors. For example, many MOSFETs and IGBTs feature bypass diodes allowing current to flow in one direction even when the transistor is OFF. When using these transistor, transistor Q1 may be replaced by a pair of back-to-back transistors (herein referred to as "transistors Q2"), with a common signal applied to both transistors' gates for turning the transistors ON and OFF. In the arrangement using transistors Q2, current might not be able to flow from one side to the other without both transistors being in the ON state.

The switching elements of each throw 406 may be switched by control device 405, which may be similar to or the same as controller 305 of FIG. 3 and/or controller 105 of FIG. 1. Control device 405 may be configured to apply control signals to transistor gate terminals (e.g. terminal G1 of throw 406a) and relay trigger terminals (e.g. terminal Ti of throw 406a).

Reference is once again made to the single-line nature of the figures used to describe illustrative embodiments. In a multi-line electrical system, each throw 406 connecting two single-terminal elements may be replaced by multiple throws connecting multiple terminals of the two elements. For example, grid 408 and load 402 may comprise three terminals ("line", "return" and "neutral") and throw 406a may be replaced by three synchronized throws (i.e. the three throws receive the same signal and switch together), each connecting a grid terminal to a corresponding terminal of load 402. Similarly, storage device 404 may comprise two terminals ("DC positive" and "DC negative"), with throw 406c replaced by two synchronized throws connecting storage device 404 to load 402.

Reference is now made to FIGS. 5A and 5B, which illustrate methods for switching according to illustrative embodiments. Methods 500 and 510 as illustrated in FIGS. 5A and 5B, respectively, may be applied to switching devices comprising one or more electromechanical relays and one or more transistors (e.g. MOSFET), such as throw 406a of FIG. 4. For simplicity, the methods will be described with regard to a switching device comprising one MOSFET and one electromechanical relay, coupled in parallel. It is understood that it is similarly applicable to switching devices comprising multiple transistors of various types and/or multiple parallel-connected relays.

Method 500 may be utilized to switch a switching device from the OFF position to the ON position. In the OFF position, at step 501, both the MOSFET and electromechanical relay may be in the OFF state. At step 502, the MOSFET is set to the ON state. The MOSFET may be set to the ON state by receiving a control signal from a control device such as control device 405 of FIG. 4. After step 502, the switching device is in the ON position, with about zero voltage between the switching device terminals, but it may not be desirable to leave the device in this state, due to the potentially high losses incurred by the MOSFET. At step 503, the electromechanical relay is set to the ON position. The electromechanical relay may be set to the ON position by receiving a control signal from a control device such as control device 405 of FIG. 4. The voltage stress on the electromechanical relay during step 503 may be about 0[V], preventing significant erosion to the relay. At step 504, the MOSFET is returned to the OFF state, leaving the electromechanical relay in the ON state. At the end of method 500, the switching device is in the ON position. The only losses incurred in the ON position may be the relay losses, which may be significantly lower than the MOSFET losses.

Method 510 may be utilized to switch a switching device from the ON position to the OFF position. In the ON position, at step 511, the MOSFET may be in the OFF state and electromechanical relay may be in the ON state. At step 512, the MOSFET may set to the ON state. The MOSFET may be set to the ON state by receiving a control signal from a control device such as control device 405 of FIG. 4. At step 513, the electromechanical relay is set to the OFF position. The voltage stress on the relay during step 513 may be about 0[V], preventing significant erosion to the relay. At step 514, the MOSFET is returned to the OFF state, leaving the relay in the OFF state. At the end of method 510, the switching device may be in the OFF position.

In some embodiments, switching at specific times along the AC-power signal may offer certain benefits. For example, switching losses across a switch may be reduced by switching the switch from ON to OFF when no current is flowing through the switch (i.e. at a "zero crossing" of the AC current signal). Similarly, switching the switch from OFF to ON may be done when the voltage drop between the switch terminals is zero (i.e. at a "zero crossing" of the AC voltage signal between the switch terminals). Zero-voltage switching and zero-current switching may also reduce thermal losses and electromagnetic interference (EMI). In some scenarios, zero-voltage switching may prevent a switch operating close to its rated voltage level from overshooting its voltage rating during a switching transient. In a system providing AC power at 50 Hz, there will be about 50 zero-crossings per second. The controller carrying out methods 500 and 510 (e.g. control device 405) may receive voltage and/or current measurements from sensors/sensor interfaces coupled to loads, and may use the measurements to provide an output switching signal to ensure that the voltage and/or current flowing through a switch is zero before connecting or disconnecting the switch.

Reference is now made to FIGS. 5C and 5D, which illustrate methods for switching according to illustrative embodiments. Methods 520 and 530 may be applied to a switch such as switch 409 of FIG. 4. In some embodiments, a power generation system (PGS) similar to or same as power generation system 101 of FIG. 1 might not be connectable to a utility grid (e.g. grid 108). For example, a PGS might include a photovoltaic inverter which has not been certified for grid-tied applications, or local utilities might may not have been approved connecting the PGS to a utility grid. In these and similar scenarios, loads may be switched from the PGS to the grid and vice-versa without connecting the PGS to the grid. According to an illustrative embodiment, individual loads are switched from one power source to another using a "break before make" method.

Referring to FIG. 5C, method 520 is a method for switching a load from a PGS to a grid according to an illustrative "break before make" embodiment. The initial conditions 521 of the load (e.g. load 402 of FIG. 4) are that the load is connected to a PGS and disconnected from the grid. At step 522, the load is disconnected from the PGS, e.g. by using method 510 to switch a throw similar to or the same as throw 406b to the OFF position. At step 523, the load is connected to the grid, e.g. by using method 500 to switch a throw similar to or the same as throw 406a to the ON position. The final conditions 524 of the load are that the load is connected to the grid and disconnected from the PGS.

Referring to FIG. 5D, method 530 is a method for switching a load from a grid to a PGS according to an illustrative "break before make" embodiment. The initial conditions 531 of the load (e.g. load 402 of FIG. 4) are that the load is connected to a grid and disconnected from the PGS. At step 532, the load is disconnected from the grid, e.g. by using method 510 to switch a throw similar to or the same as throw 406a to the OFF position. At step 533, the load is connected to the PGS, e.g. by using method 500 to switch a throw similar to or the same as throw 406b to the ON position. The final conditions 534 of the load are that the load is connected to the PGS and disconnected from the grid.

When applying method 520 and method 530, switching is preferably fast enough to provide a near-continuous power supply to the load being switched. Switch drivers may be designed to switch MOSFETs (or alternative transistors) at high speeds, with switching times of several nanoseconds, dozens of nanoseconds or hundreds of nanoseconds. Implementing fast-switching when applying method 520 and method 530 may ensure that the load is disconnected for only a very short period of time, having negligible effect.

Figure 6:
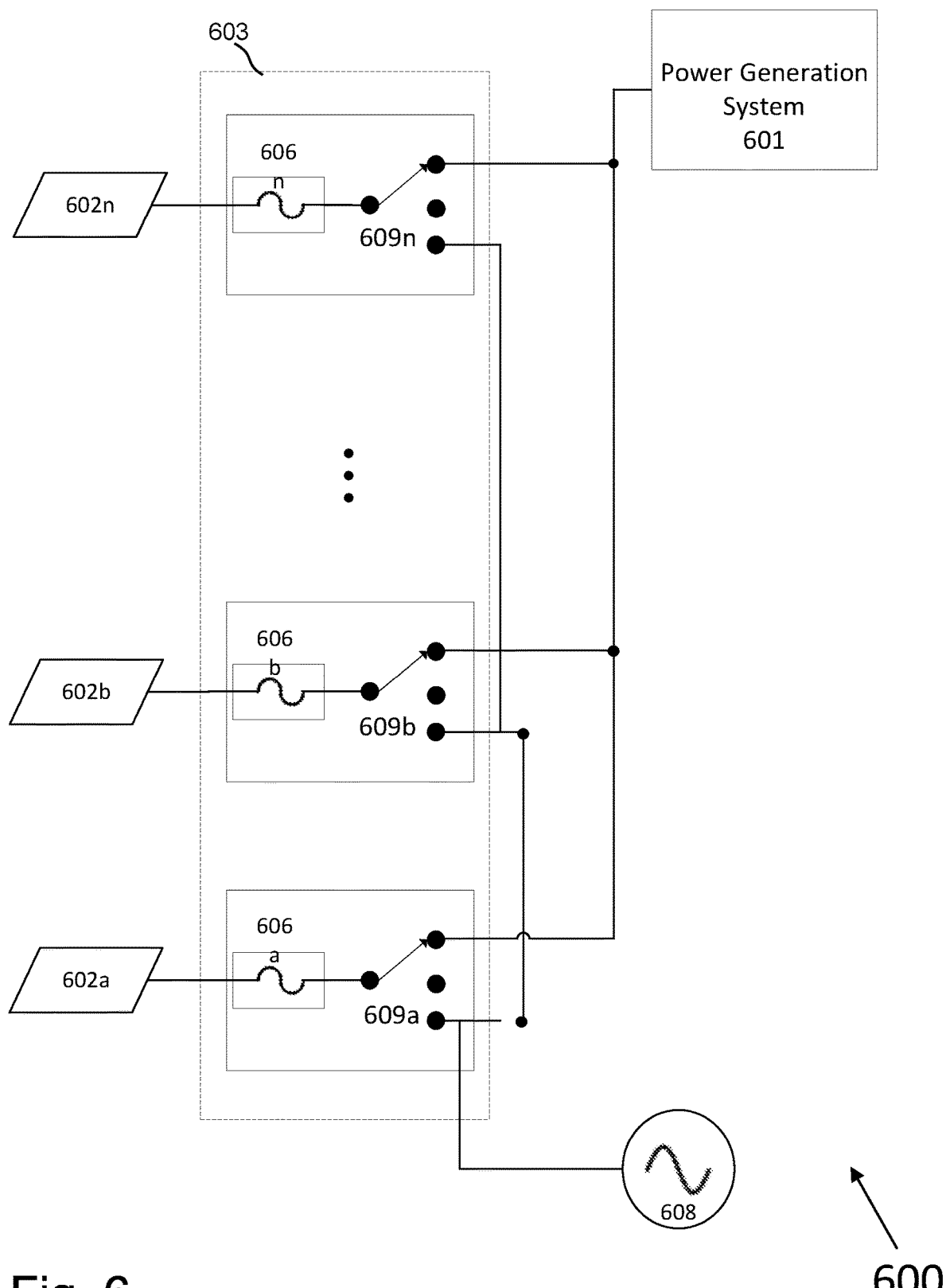
FIG. 6 is a part-schematic, part block diagram of an electrical system according to illustrative embodiments.

Reference is now made to FIG. 6, which is a part-schematic, part block diagram of an electrical system according to illustrative embodiments. Electrical system 600 may be similar to electrical system 300 of FIG. 3, with differences in the arrangement of electrical connectivity between power sources and loads. Electrical system 600 may comprise grid 608 (similar to or the same as grid 108 of FIG. 1), power generation system 601 (similar to or the same as power generation system 101 of FIG. 1 and/or power generation system 301 of FIG. 3) and loads 602a, 602b . . . 602n (collectively referred to as "loads 602") coupled to grid 608 and power generation system 601 via switching circuit 603. Switching circuit 603 may comprise switches 609a, 609b . . . 609n (collectively referred to as "switches 609"). Each switch of switches 609 may be similar to or the same as a switch of switches 309 of FIG. 3, or switch 409 of FIG. 4. Circuit breakers 606a, 606b . . . 606n (collectively referred to as "circuit breakers 606") may be coupled to or integrated with switches 609a, 609b . . . 609n, respectively. In some embodiments, each circuit breaker 606 may be integrated with a switch 609 and packaged and deployed as a single device. Circuit breakers 606 may be similar to or the same as circuit breaker 306 of FIG. 3. In the illustrative embodiment of FIG. 6, grid 608 and power generation system 601 may "share" circuit breakers 606, i.e. each circuit breaker of circuit breakers 606 may disconnect a load of loads 602 (e.g. in case of detection of an unsafe condition) regardless of the power source the load is connected to, which may, in some embodiments, simplify the design and reduce the costs of an distribution board electrical comprising switching circuit 603.

In some embodiments, electrical system 600 may further include a storage device (not explicitly depicted) similar to or the same as storage device 104 of FIG. 1, connectable to power generation system 601 and/or loads 602. Similarly, electrical system 600 may further include a controller (not explicitly depicted) similar to or the same as controller 105 of FIG. 1 and/or controller 305 of FIG. 3 configured to communicate with (e.g. via communication devices similar to or the same as communication devices 106 and 107 of FIG. 1) and control switching circuit 603 and/or power generation system 601.

Referring to FIG. 7A, an illustrative application running on a smart phone, tablet, computer, workstation server, mobile device (such as a cellular device) and/or a similar computing device is shown. The application may provide a list of loads of an electrical power system (e.g. electrical systems 100, 300 or 600). The application may provide a descriptive name of each load (e.g. "dining room outlet #1", "Master bedroom lights"). In some embodiments, where individual load values are available, the application may provide the current load value for each load. In some embodiments, the application may indicate the power source currently providing each load on the list with power. The application may provide an option for manually changing the power source providing a specific load with power. For example, a user may activate (e.g. using a touchscreen on a mobile phone, or a mouse on a computer) "Switch source" button 701 located by load #4 ("Dining room lighting"), and be presented with the option of switching load #2 from a PV inverter to the grid or a battery. Such an action may be desirable when a system maintainer (e.g. installer or electrical worker) would like to shut down a part of the electrical system (e.g. routine maintenance of the PV inverter) and needs to first transfer loads connected to that part to a different power source. In some embodiments, automatic division of loads amongst different power sources may result in suboptimal division, and manual corrections may be beneficial.

Still referring to FIG. 7A, the application may further include information regarding the current state of a storage device similar to or the same as storage device 104 of FIG. 1. For example, the system described by the application of FIG. 7A may include a battery, with the application displaying the current state of the battery (e.g. charging, discharging or neither charging nor discharging), the current rate of charging/discharging and the current energy level stored by the battery. The application may further enable a user to change the state of the storage device, for example, by providing button 702 for switching the storage device mode from "charge" mode to "discharge" mode.

Still referring to FIG. 7A, the application may be connected to wired communication networks, wireless communication networks, and/or data network(s), including an Intranet or the Internet. The application may receive data from and send commands to system devices (e.g. power generation system 101, loads 102, storage device 104 and/or switching circuit 103) via the computing device on which the application is executing. In addition to providing information and control-related services to the end user, the application may receive notification of a potentially unsafe condition from one or more system-connected control and/or communication devices, and warn the user (e.g. a system maintenance worker). These warnings can be audio and/or visual. They may, for example, be a beep, tone, siren, LED, and/or high lumen LED. For example, if a circuit breaker 606 of FIG. 6a detects a leakage current, it may, in addition to disconnecting load 602a, trigger a warning to be sent (by a control and/or communication device included in electrical system 600) to the application of FIG. 7A. The notification may be received by the application and the application may subsequently trigger one or more of the aforementioned warnings.

Reference is now made to FIG. 7B, which shows the application of FIG. 7A providing updated information regarding the state of an electrical system. The production of a system-connected PV inverter (e.g. inverter 313 of FIG. 3) may decrease from the 3 kW depicted in FIG. 7A to the 1 kW depicted by FIG. 7B. In response to the reduction in the PV-inverter production, the system may switch several loads from the PV inverter to the grid. For example, load #1 ("Kitchen lighting") may be switched from the PV inverter to the grid. Furthermore, the battery may be switched from the "charge" to "discharge" mode. Additional loads may be connected in the interim period of time as well, resulting in an increase in power drawn from the grid from 1910 W to 4.5 kW. The selection of the loads to be switched from the PV inverter to the grid may be performed using the steps discussed in reference to FIG. 2 above and those discussed below in reference to the method of FIG. 9A and method 980 of FIG. 9B.

It is to be understood that the applications as illustrated in FIGS. 7A and 7B are merely illustrative embodiments. User-interface applications may offer many additional features such as time and date indications, graphical system illustrations, communication services, weather forecasts, generation and load forecasts, service call capabilities and more. Furthermore, some applications may serve several electrical power systems, with a user able to scroll between screens indicating different electrical systems, and view and control each system individually.

Figure 8:
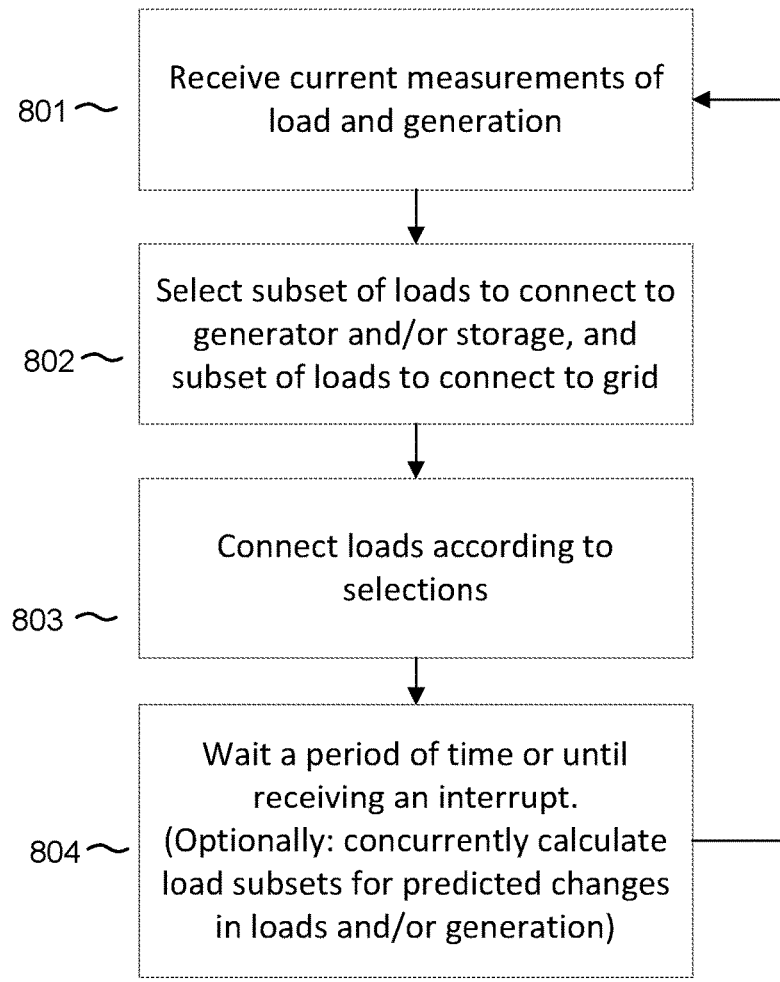
FIG. 8 is a flow diagram of a method for load management in an electrical system according to illustrative embodiments.

Reference is now made to FIG. 8, which shows a flow diagram of a method for load management in an electrical system according to illustrative embodiments. Method 800 may be carried out by a controller (e.g. controller 105 of FIG. 1) configured to control a switching circuit (e.g. switching circuit 103 of FIG. 1) for division of a group of loads (e.g. the loads 102 of FIG. 1) amongst a plurality of power sources (e.g. grid 108 and power generation system 101 of FIG. 1). At step 801, the controller may receive one or more current measurements of load values and one or more power generation values from a generator. For example, the controller may receive one or more load measurements indicating. the power consumed by loads 102 of FIG. 1. The controller may further receive one or more power generation values indicating the power produced by power generation system 101 and/or the power discharged by storage device 104. The controller may receive the one or more load and generation measurements via a wired or wireless communication device, e.g. via communication devices 106, 107, 118 and/or 109.

At step 802, the controller may select a subset of loads to connect to the generator and/or a connected storage device, with the remainder of the loads to be connected to the grid or to remain connected to the grid. As discussed above, it may be desirable (e.g. in locations where a feed-in tariff is low on nonexistent) to maximize the power delivered by the generator to loads, without surpassing the generator's capacity. This problem shall be referred to in this disclosure as the "Load Subset Problem" (LSP). The LSP can be formulated as a variant of the "0-1 Knapsack problem" (KP) The KP may be described by the following description: "Given a set of items, each item having a weight and a value, determine a subset of items to include in a collection such that the total weight is less than or equal to a given limit and the total value is maximal". The LSP may be formulated as a private or variant case of the KP, where each item is a represented load, with the value and weight each item equaling the power consumed by the corresponding load. The given limit is the generating capacity of the generator. When applied to systems including a storage device which can function either as a generator (i.e. when discharging) or as a load (when charging), the problem may be adapted to dynamically increase the given limit (when the storage device is discharging) or add an item to the set, the item having a value and weight of the power consumed by the storage device when charging.

The KP is solvable in pseudo-polynomial time by dynamic-programming (DP) techniques. Alternatively, the problem may be solved using a "brute force" (BF) algorithm, i.e. calculating the total consumption of each possible subset of loads, and selecting the subset of maximum consumption which still does not exceed the generator capacity. In general, BF methods run in exponential time, i.e. time proportional to $2^n$, with n representing the number of loads. In systems where n is not great (e.g. a system comprising only 10 or 20 loads), a BF algorithm may still provide acceptable timing performance. In contrast, a DP method may run in time proportional to n·G, where G is the generator capacity. In some embodiments, the DP may provide better time performance, but at the cost of requiring significantly greater memory resources. An example of a BF solution for step 802 is provided in FIG. 9A. If a DP solution is preferred, a person of skill in the art will be able to implement one by via originally-written code, or obtaining code from other sources.

Still referring to step 802 of FIG. 8, both BF and DP solutions may determine that switching a significant number of loads is desirable. In extreme cases, DF and DP solutions may determine that each load should be switched from the current power source powering it to a different power source. Frequent switching of loads may be undesirable, as it may, in some embodiments, wear out switches and/or cause cumulative erosion of the loads. For example, in the case of some electrical appliances, constantly changing the power source may cause damage. Furthermore, in large systems (e.g. systems comprising tens or hundreds of loads), the time consumed by both DP and BF methods may be too long for real-time applications (e.g. in case of sudden generation reduction). In some embodiments, it may be desirable to implement one or more alternative methods which might be suboptimal with regard to the LSP, but may offer incremental improvement over current operating conditions and/or prevent a situation where certain loads are not receiving enough power. For example, a system controller may be configured to respond to a sudden decrease in generation by immediately switching a subset of loads to the grid to ensure continuous power supply to all loads, and then selectively switching certain loads to the generator, ensuring the total power consumed by loads connected to the generator does not exceed the generator capacity. Illustrative embodiments of methods for carrying out these steps are disclosed in FIGS. 9B and 9C.

At step 803, the controller executing method 800 may control a switching circuit (e.g. switching circuit 103 of FIG. 1) to connect the loads to power sources according to the subsets selected in step 802. At step 804, the controller may wait a period of time before looping back to step 801. In some embodiments, the controller may remain at step 804 until an interrupt is received, which may trigger a loop back to step 804. In one example, an interrupt may be received when there is a change in load or generation measurements. In some embodiments, the controller may utilize the time spend at step 804 to concurrently carry out additional calculations. For example, the controller may, at step 802, switch loads according to the methods of FIGS. 9B-9E to obtain a load division which may be preferable to the previous load division yet not optimal, and at step 804 the method may run a BF or DP method to obtain an optimal division.

Still referring to step 804 of FIG. 8, the controller may utilize the time before looping back to step 801 to consider likely future scenarios it may need to respond to. For example, the controller may attempt to predict future load and/or generation measurements, and run BF methods, DP methods or other methods to solve the LSP considering likely future scenarios. For example, the controller may run LSP-solving methods considering generation which is 90% or 110% of the current generation level, and considering load consumption which is 90% or 110% of the current load consumption level. Carrying out LSP-solving methods in advance may allow more effective real-time responses, (i.e. when changes in generation and/or load consumption are measured). Load consumption prediction and generation prediction are both highly studied fields of research, with a myriad of forecasting methods available. For reasonably simple and predictable electrical systems, linear regression models may provide adequate load and/or generation forecasts. For more complex systems, Artificial Neural Networks or other machine learning techniques may provide more accurate forecasts of power generation and/or consumption.

In some systems, a local memory device may log previously measured load and generation values for future reference. Logged measurements may provide indications of future changes in load and/or generation. For example, in some home electrical systems, a kitchen oven is frequently turned off at 6 pm at dinnertime, or a television set is frequently turned on at 9 pm on Tuesday evenings for a favorite TV show. In some systems, the hour of day at which shade from a tree begins to cover a photovoltaic panel may vary by a few minutes on a day-to-day basis (as the days get gradually longer or shorter), and a trained controller may be able to predict at what exact minute a dip in PV generation may occur. At step 804, a controller may access logged historical data to predict likely load and generation measurements, and calculate preferable load division accordingly.

Figure 9A:
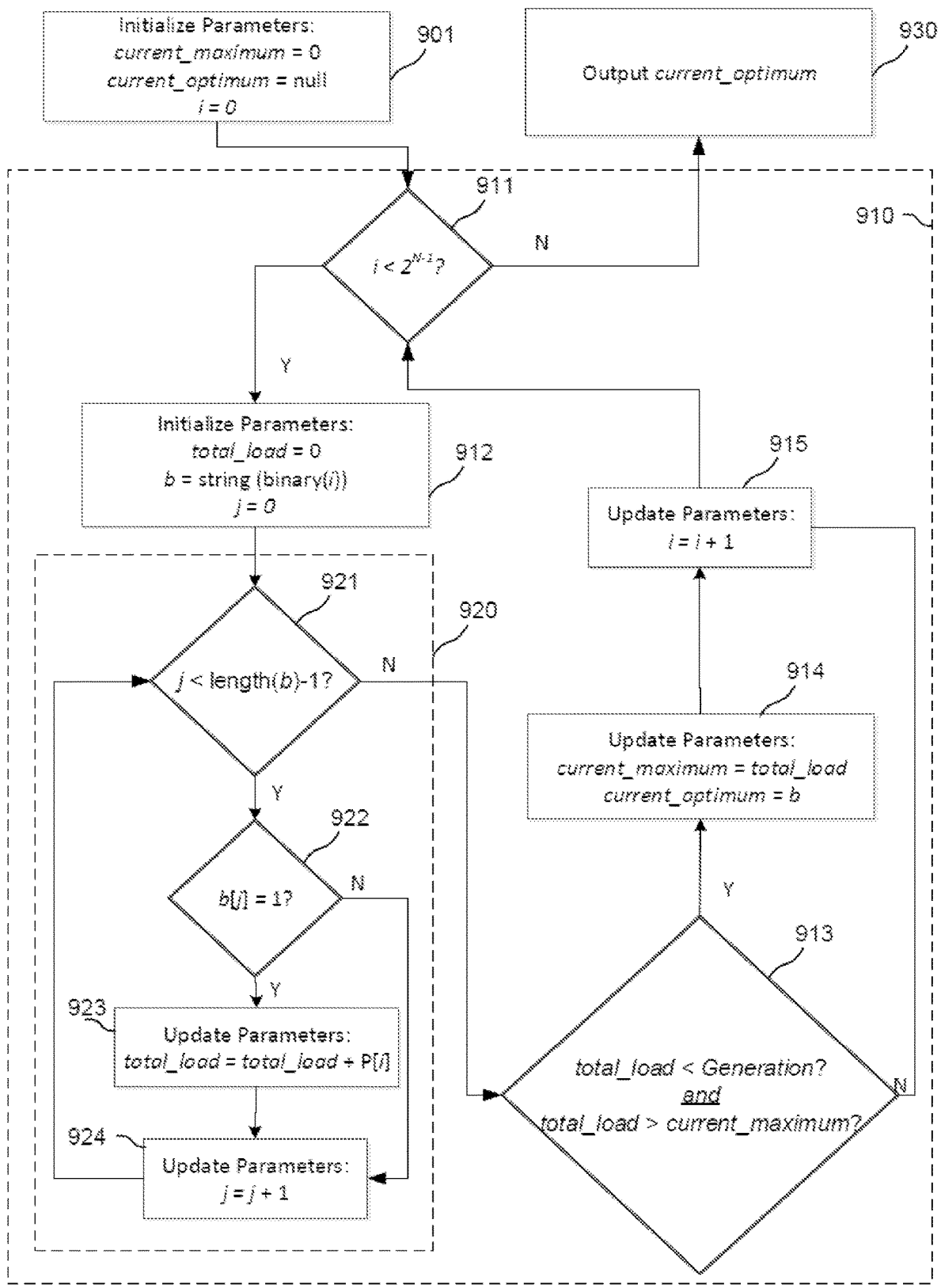
FIGS. 9A-9E are flow diagrams of methods for load management in an electrical system according to illustrative embodiments.

Reference is now made to FIG. 9A, which illustrates a flow diagram for a "Brute force" (BF) method for calculating an optimal division of loads into subsets. The illustrated method assumes that a system has two possible power sources—a generator (e.g. power generation system 101 of FIG. 1) and a grid (e.g. grid 108 of FIG. 1). It is assumed that a list of N loads (e.g. loads 102) is accessible via an array P, with the element P[i] indicating the power consumed by the $i^{th}$ load. It is assumed that the current power output capacity of the generator is known and referred to as the parameter Generation. At step 901, one or more local variables may be initialized. In one example, the parameter current maximum (representing the current maximum load consumption be connected to the generator so far) may be initialized to zero. Additionally, the parameter current optimum (representing a string indicating the optimal division of the loads into subsets) may be initialized to a null or empty string. Additionally, the parameter i (representing a counter for loop 910) may be initialized to 0. At step 911, execution of loop 910 may begin. Loop 910 may be executed $2^N$ times, once for each possible division of the loads into two groups. In systems where three power supplies are available (e.g. a grid, generator and storage device), the loop may be executed $3^N$ times, once for each possible division of the loads into three groups.

At step 911, it is determined whether counter i is less than $2^{N-1}$. If the counter i is less than $2^{N-1}$, processing may proceed to step 912, where additional parameters may be initialized. The parameter b is set to be the binary representation of i, with i as the loop counter of loop 910. For example, at the 18-th iteration of loop 910, the parameter b will contain the string '10001', which is the binary representation of the decimal number 17. The parameter total_load, representing the current total load consumption assumed to be connected to the generator according to the arrangement indicated by b, is set to zero. Additionally, the parameter j, the counter for loop 920, is set to zero. The loop 920 will be executed once for each character of string b. At step 921, processing of loop 920 begins by determining if the current value of parameter j (the counter for loop 920) is less than the value of length(b)−1. If the current value of parameter j is less than the value of length(b)−1, processing continues to step 922, where the character of parameter b is evaluated. If the $j^{th}$ character is 1', the $j^{th}$ load is considered connected to the generator. Therefore, at step 923, the consumption level of the $j^{th}$ load is added to the parameter total_load, which represents the current total load consumption connected to the generator according to the arrangement indicated by parameter b. After step 923 and/or if the evaluation at step 922 indicates that the $j^{th}$ load is not 1', processing continues to step 924, where the loop counter j is incremented by 1. Processing may return to step 921, where processing of loop 920 may then repeat for the incremented value j if j is less than the value of length(b)−1. Alternatively, processing of loop 920 may end (i.e. if j is not less than the value of length(b)−1). After loop 920 is executed j times, the variable total_load will contain the total load consumption connected to the generator according to the arrangement indicated by parameter b. If processing of loop 920 is complete (i.e. if j is not less than the value of length(b)−1), processing may proceed to step 913.

At step 913, the parameter total_load, which represents the total load consumption connected to the generator, is compared to the parameter Generation, which represents the current power output capacity of the generator (i.e. the maximum allowed consumption to be connected to the generator), and to the parameter current_maximum, which represents the maximum load consumption connected to the generator so far. In some embodiments, the parameter Generation may indicate an allowable consumption which may be less than the current power generated by a generator (e.g. if excess generation margins are desired, as discussed with regard to FIG. 2). If the parameter total_load is less than or equal to the parameter Generation and the parameter total_load is greater than the parameter current_maximum, the variable current_maximum is set to equal total_load, and the variable current_optimum, representing a string indicating the optimal division of the loads into subsets, is set to equal the string b. In other words, the parameters current_maximum and current_optimum track the best solution so far, i.e. the solution which divides the loads such that the generator-connected load is maximized without surpassing Generation. Current optimum represents the division of loads into groups (the $i^{th}$ character of current_optimum being set to '1' if the $i^{th}$ load is connected to the generator, and '0' otherwise), and current_maximum tracks the numerical value of the total load connected to generator under the arrangement represented by current_optimum. After the updating of the parameters in step 914 (or if, at step 913, it is determined that total_load is not greater than Generation and/or that total_load is not greater than current_maximum), processing may proceed to step 915, where the value of the parameter i, representing the loop counter for loop 910, may be incremented by 1. Processing may then return to step 911, where it may be determined whether counter i is less than $2^{N-1}$. If the counter i is less than $2^{N-1}$, execution of loop 910 may be repeated. If the determination at step 911 indicates that counter i is not less than $2^{N-1}$, execution of loop 910 may end. Once execution of loop 910 is complete, all 2 N load subsets have been considered, with the parameters current maximum and current optimum containing the maximum load consumption that has been connected to the generator and a string indicating the optimal division of the loads into subsets, respectively. These parameters may be output at step 902.

Figure 9B:
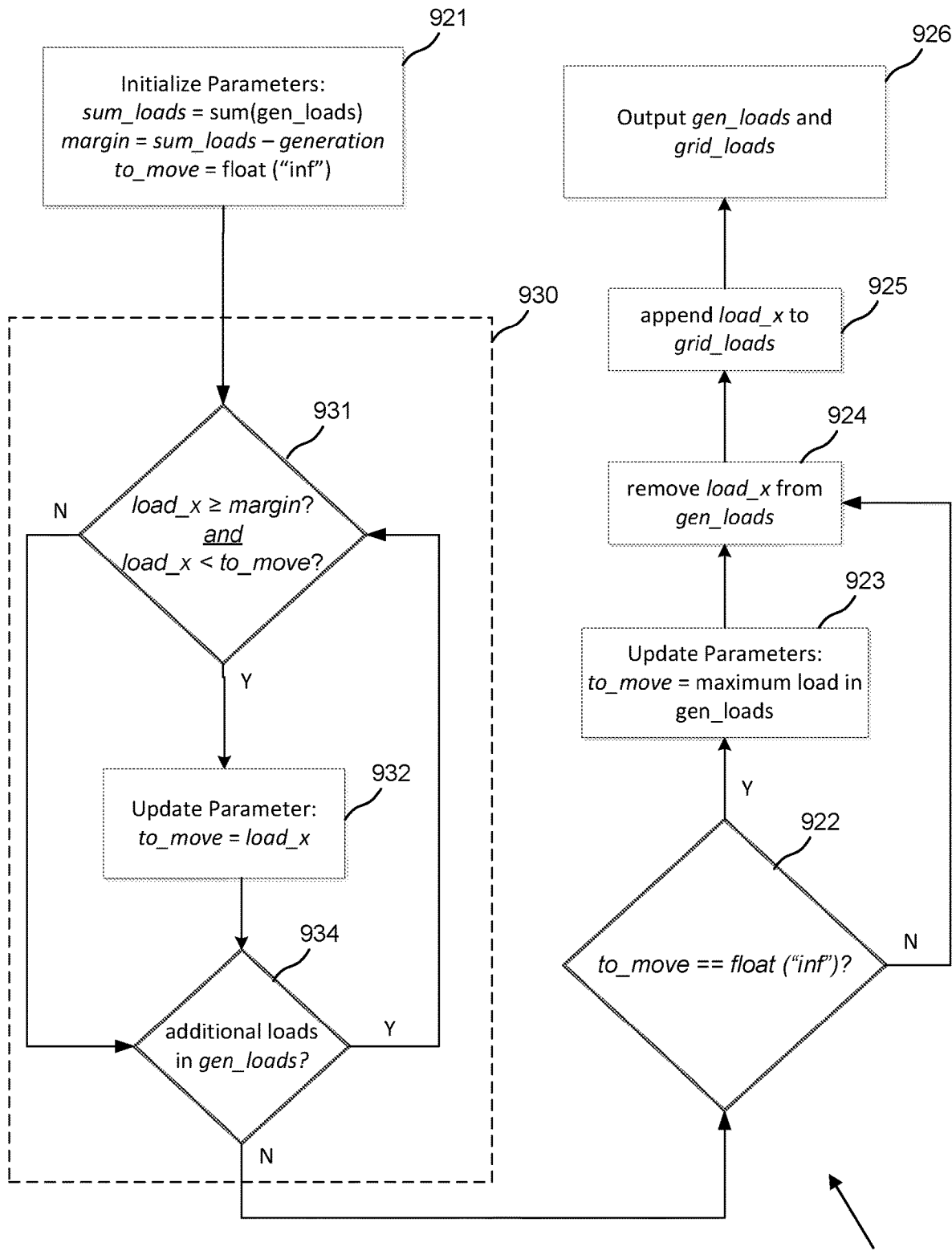

Reference is now made to FIG. 9B, which illustrates a method for determining which loads to switch between power sources. Method 980 may be an example of a method for selecting a load to switch from a generator (e.g. power generation system 101) to a grid (e.g. grid 108). Method 980 may be triggered in response to a condition where the cumulative consumption of a group of loads connected to a generator exceeds the capacity of the generator. Method 980 may receive as input a list of loads currently connected to the generator (referred to herein as parameter gen_loads), a list of loads currently connected to the grid (referred to herein as parameter grid_loads), and the maximum allowed consumption to be connected to the generator (referred to herein as parameter generation). At step 921, a set of parameters may be initialized. For example, the total consumption of the loads connected to the generator may be calculated (shown as "sum(gen_loads)") and stored in the parameter sum_loads. Additionally, the difference between sum_loads and generation may be calculated and stored in the parameter margin. The difference stored in the parameter margin may indicate the minimal load consumption which may be required to be switched from the generator to the grid. Additionally, a parameter to_move, representing the load to be switched, may be initialized to a float infinity value (shown as float("inf")). Processing may proceed to step 931, the first step within loop 930. Loop 930 may be executed once for each load connected to the generator. Each generator-connected load is referred to in turn (i.e. at one loop iteration) as load_x. At step 931, the value of load_x is compared both to the parameter margin, representing the load level which needs to be shed from the generator, and to the parameter to_move, representing the current load selected for switching from the generator to the grid. If load_x is smaller than to_move and load_x is larger than or equal to margin, load_x is selected as the best candidate (so far) for switching from the generator to the grid, as switching load_x from the generator reduces the total generator-connected load consumption to the maximum acceptable level (or lower) while maximizing the generator-connected load consumption. Accordingly, at step 932, parameter to_move, representing the current load selected for switching from the generator to the grid is set to equal load_x, the current load being evaluated. At step 934, it may be determined if there are additional loads in gen_loads (i.e. the list of loads currently connected to the generator) which have not yet been evaluated at step 931. If, at step 934, it is determined that there are one or more additional loads in gen_loads, processing may return to step 931, where the analysis of loop 930 may be repeated for the next load in gen_loads. If, at step 934, it is determined that there are no additional loads in gen_loads, execution of loop 930 is complete, and processing may proceed to step 922.

At step 922, the validity of to_move (the load selected by the execution of loop 930 to be switched from the generator to the grid) is evaluated. For example, if all generator-connected loads evaluated at step 931 are smaller than margin, no load will be selected at step 932 (i.e. by loop 930). If at step 922 no load_x has been selected as to_move (i.e. the parameter to_move is still equal its initial value of infinity), then proceeding may proceed to step 923. At step 923, the largest generator-connected-load may be selected for switching from the generator to the grid. This step might not reduce the total generator-connected-load consumption to an acceptable level, but it may reduce the generator-connected-load consumption nonetheless. Method 980 may be invoked additional times until the total generator-connected-load consumption reaches an acceptable level. After step 923 and/or if a load_x has been selected as to_move at step 922 (i.e. the value of to_move is different than the initial value of infinity), processing may proceed to step 924. At step 924, the selected load for switching from the generator to the grid (load_x) is removed from the gen_loads list. At step 925, the selected load for switching from the generator to the grid (load_x) is appended to the grid_loads list. At step 926, the updated lists gen_loads and grid_loads are returned.

Figure 9C:
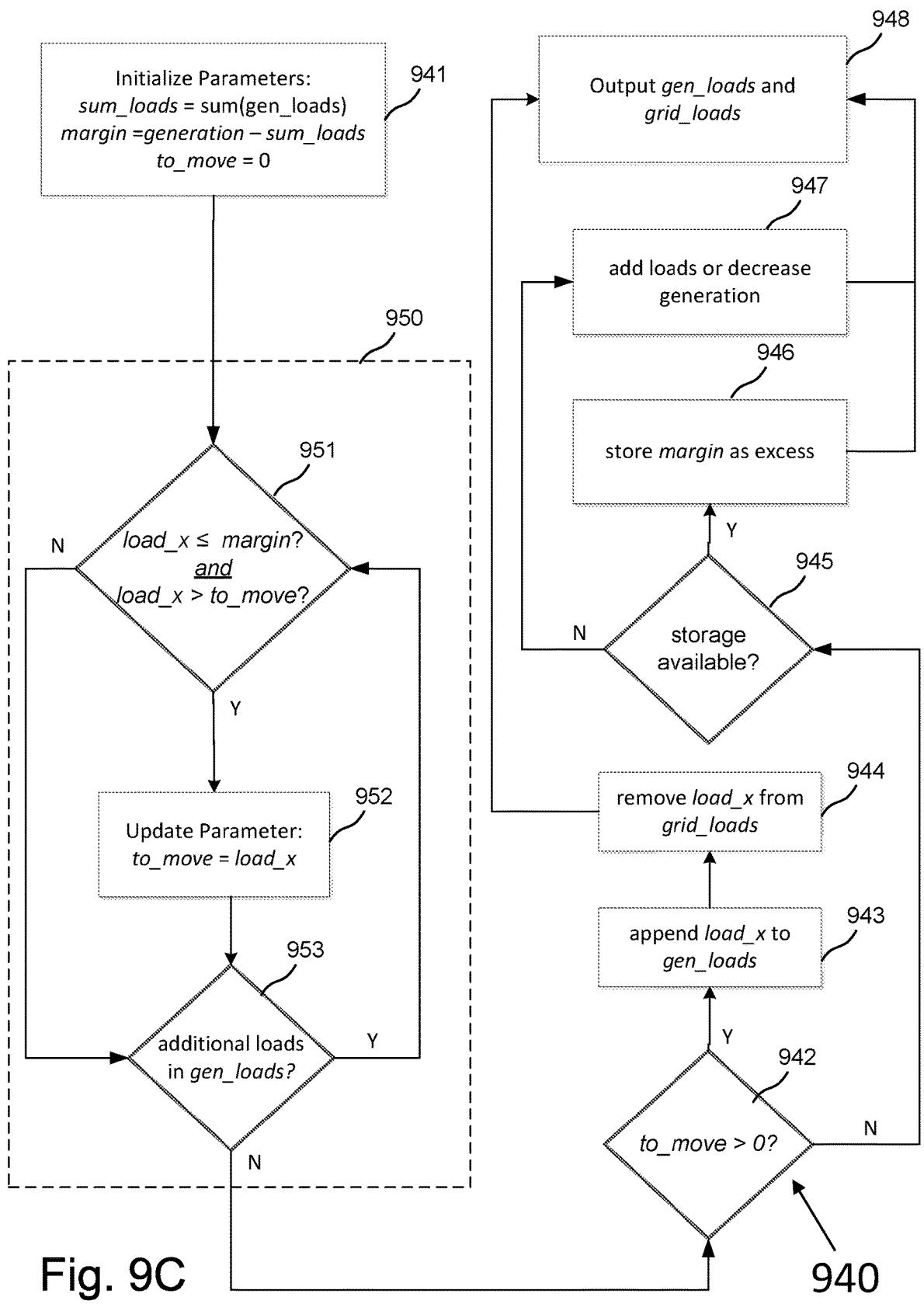

Reference is now made to FIG. 9C, which illustrates a method for selecting a load to switch from a grid (e.g. grid 108 of FIG. 1) to a generator (e.g. power generation system 101). Method 940 may be triggered in response to a condition where the cumulative consumption of a group of loads connected to a generator is less than the capacity of the generator. Method 940 may receive as input a list of loads currently connected to the generator (herein referred to as gen_loads), a list of loads currently connected to the grid (herein referred to as grid_loads), and the maximum allowed consumption to be connected to the generator (herein referred to as generation). At step 941, a set of parameters may be initialized. For example, the total consumption of the loads connected to the generator is calculated (shown as sum(gen_loads)) and stored in the variable sum_loads. Additionally, the difference between generation, representing the maximum allowed consumption to be connected to the generator, and sum_loads, representing the total consumption of the loads connected to the generator is calculated and stored in the parameter margin, the difference indicating the additional load consumption which may be added to the generator without exceeding the generator's capacity. Additionally, a variable to_move is initialized for storing the load to be switched from the grid to the generator. Processing may then proceed to step 951, which is the first step of loop 950. Loop 950 may be executed once for each load connected to the grid. Each grid-connected load is referred to in turn (i.e. at one loop iteration) as load_x. At step 951, the value of load_x is compared both to the parameter margin (i.e. the load level which may be switched from the grid to the generator) and to the current load selected for switching from the grid to the generator, represented by parameter to_move. If load_x is larger than to_move and load_x is smaller than or equal to margin, load_x is selected as the best candidate (so far) for switching from the grid to the generator, as switching x from the grid to the generator (currently) maximizes the total generator-connected load consumption while remaining below or being equal to the maximum acceptable load consumption. Accordingly, if load_x is larger than to_move and load_x is smaller than or equal to margin, at step 952, the parameter to_move is set to be equal to load_x. At step 953, it may be determined if there are additional loads in grid_loads (i.e. the list of loads currently connected to the generator) which have not yet been evaluated by step 951. If, at step 953, it is determined that there are one or more additional loads in grid_loads, processing may return to step 951, where the analysis of loop 950 may be repeated for the next load in grid_loads. If, at step 953, it is determined that there are no additional loads in grid_loads, execution of loop 950 is complete, and processing may proceed to step 942.

At step 942, the validity of to_move (the load selected by the execution of loop 950 to be switched from the grid to the generator) is evaluated. For example, if all grid-connected loads evaluated at step 951 are larger than margin, no load will be selected at step 952. If, at step 952, a load load_x has been selected for to_move (i.e. the value of to_move is determined, at step 942, to be greater than zero), processing may proceed to step 943, where load_x may be appended to gen_loads (i.e. the list of loads connected to the generator), and to step 944, where load_x may be removed from grid_loads (i.e. the list of loads connected to the grid) If no load has been selected for to_move (i.e. i.e. the value of to_move is determined, at step 942, to not be greater than zero), processing may proceed to step 945, where it may be determined if a storage device (e.g. storage device 104) is available for storing the excess power generated. If a storage device is available, processing may proceed to step 946, where a function to command the storage device to begin storing margin power may be called. If no storage device is available at step 945, processing may proceed to step 947, where additional loads may be connected to the generator or the power generated by the generator may be decreased, as described with regard to step 207 of FIG. 2. After each of steps 944, 946, and 947, processing may proceed to step 948, where the updated lists gen_loads and grid_loads may be output.

Figure 9D:
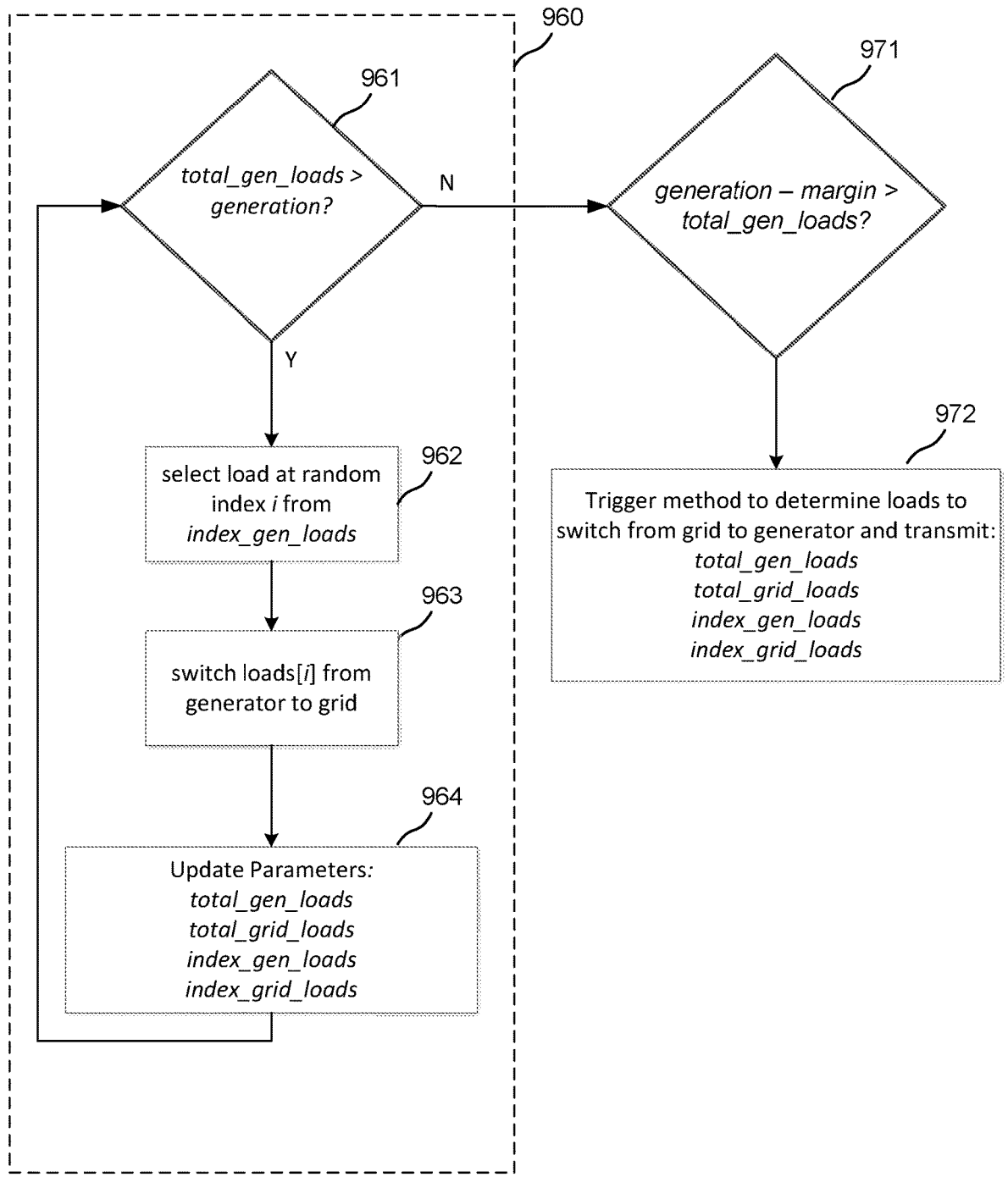

Reference is now made to FIG. 9D, which illustrates an example of a method for switching one or more loads from a generator (e.g. power generation system 101) to a grid (e.g. grid 108). Method 970 may be triggered in response to a condition where the cumulative consumption of a group of loads connected to a generator exceeds the capacity of the generator. Method 970 may receive as input one or more parameters indicating the total consumption connected to a generator (total_gen_loads), the total consumption connected to a grid (total_grid_loads), lists of indices indicating which loads are connected to the generator and grid, (index_gen_loads and index_grid_loads, respectively) and the current maximum allowable consumption for connecting to the generator (generation). The difference between total_gen_loads and generation may be calculated and stored in the parameter margin. The difference stored in the parameter margin may indicate the minimal load consumption which may be required to be switched from the generator to the grid. Method 970 might not assume that individual load consumption values are known, and may attempt to reduce the total load connected to the generator without knowing individual load consumption values. Loop 960 of method 970 may execute as long as total_gen_loads is greater than generation, i.e. it may be necessary to reduce the load consumption connected to the generator. If, at step 961, total_gen_loads is greater than generation, a generator-connected load from index_gen_loads at randomly selected index i may be selected at step 962. At step 963, the selected load may be switched from the generator to the grid. At step 964, an updated set of parameters, including total_gen_loads, total_grid_loads, index_gen_loads, index_grid_loads may be calculated. Loop 960 may then be repeated until the total generator-connected load consumption is less than generation, i.e. the allowable maximum total generator-connected consumption.

If, at step 961, total_gen_loads is not greater than generation, the resultant division of loads amongst the grid and generator (resulting from the one or more executions of loop 960) may be evaluated. If the one or more executions of loop 960 switched a large load from the generator to the grid, a large excess generation margin may have been created and it may be desirable to switch a potentially smaller load from the grid to the generator in order to maximize the generator-connected load consumption while not exceeding generation. Accordingly, at step 971, if the difference between the parameter generation and the parameter margin is greater than the parameter total_gen_loads, at step 972, a method to switch or more loads from a grid (e.g. grid 108) to a generator (e.g. power generation system 101) may be called. An example method to switch or more loads from a grid to a generator is discussed below in reference to FIG. 9E. Calling the method to switch or more loads from a grid to a generator may include the transmittal of one or more calculated parameters (i.e. the parameters calculated at step 964 in the last execution of loop 960), such as total_gen_loads, total_grid_loads, index_gen_loads, index_grid_loads.

Figure 9E:
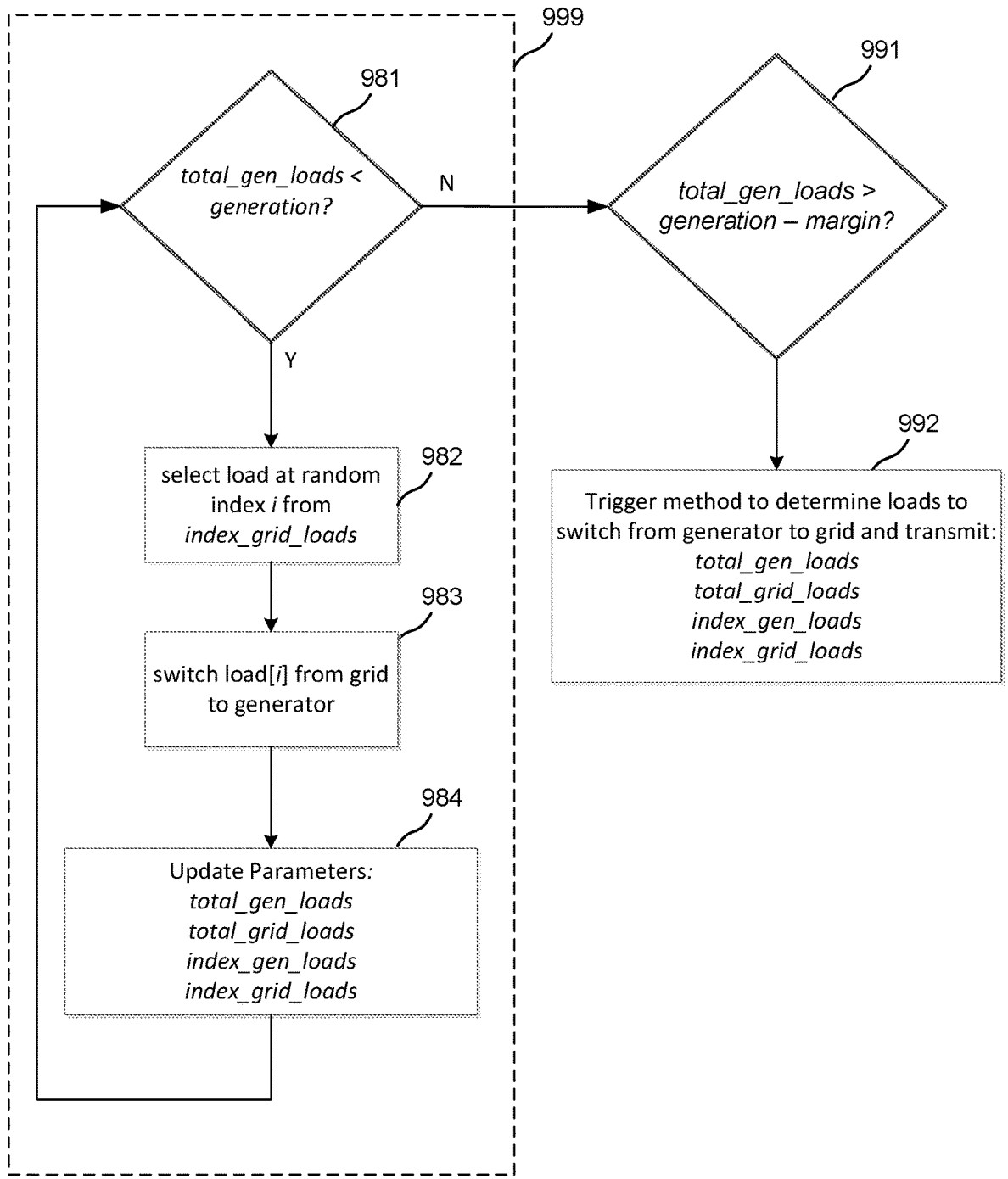

Referring to FIG. 9E, an example of a method for switching one or more loads from a grid (e.g. grid 108) to a generator (e.g. power generation system 101). Method 990 may be triggered in response to a condition where the cumulative consumption of a group of loads connected to a generator is below the capacity of the generator. Method 990 may receive as input a variable indicating the total consumption connected to a generator (total_gen_loads), the total consumption connected to a grid (total_grid_loads), lists of indices indicating which loads are connected to the generator and grid, respectively (index_gen_loads and index_grid_loads), and the current maximum allowable consumption for connecting to the generator (generation). Additionally, the difference between generation, representing the maximum allowed consumption to be connected to the generator, and total_gen_loads, representing the total consumption of the loads connected to the generator is calculated and stored in the parameter margin, the difference indicating the additional load consumption which may be switched from the grid to the generator without exceeding the generator's capacity. Method 990 might not assume that individual load consumption values are known, and may attempt to increase the total load connected to the generator without knowing individual load consumption values. The execution of loop 999 may be repeated as long as total_gen_loads is smaller than generation, i.e. it may be desirable to increase the load consumption connected to the generator. If, at step 981, total_gen_loads is smaller than generation, a grid-connected load from index_grid_loads at random index i may be selected. At step 983, the selected load (shown as load[i]) may be switched from the grid to the generator. At step 984, the resultant parameters total_gen_loads, total_grid_loads, index_gen_loads, index_grid_loads may be calculated. Execution of loop 999 may then repeat until the total generator-connected load consumption is greater than generation, i.e. the allowable maximum total grid-connected consumption.

If, at step 981, total_gen_loads is not smaller than generation, execution of loop 999 is complete, and at step 991, the resultant division of loads amongst the grid and generator may be evaluated. If, at step 983, a large load was switched from the grid to the generator, a large negative generation margin may have been created, and it may be desirable to switch a load from the generator to the grid in order to reduce the generator-connected load consumption to below generation. Accordingly, if at step 991, if the parameter total_gen_loads is greater than the difference between the values of parameters generation and margin, method 970, as discussed above in reference to FIG. 9D, may be called. As noted above, method 970 is an example of a method for switching one or more loads from a generator (e.g. power generation system 101) to a grid (e.g. grid 108). Calling the method to switch or more loads from the generator to the grid may include the transmittal of one or more calculated parameters (i.e. the calculation of these parameters at step 984 in the last iteration of loop 999), such as total_gen_loads, total_grid_loads, index_gen_loads, index_grid_loads It is to be understood that direct application of methods 970 and 990 described above may result in oscillatory behavior, where loads are constantly switched between the generator and the grid. Such constant switching might not, in some embodiments, be desirable. In some embodiments, methods 970 and 990 may be slightly modified to include "stopping conditions," effectively maintaining an acceptable division of loads between the grid and generator for a period of time, before re-evaluating the load division (e.g. after a period of time has elapsed or an interrupt has been received).

Figure 10:
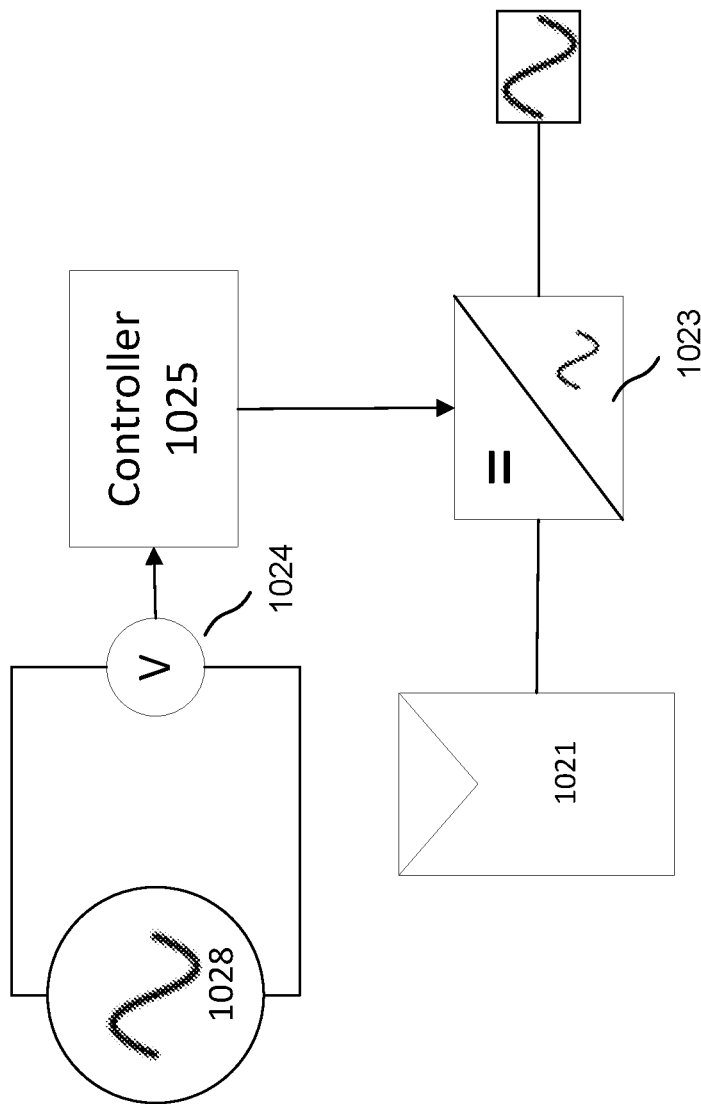
FIG. 10 is a part-schematic, part block diagram of a system for voltage synchronization according to illustrative embodiments.

Reference is now made to FIG. 10, which is a part-schematic, part block diagram of a system for voltage synchronization according to illustrative embodiments. In some electrical systems, it may be desirable to synchronize the voltage output by a grid and the voltage output by an alternative power source. For example, if a load is switched from an electrical grid to the output of a PV inverter, if the PV inverter and the grid are not in-phase, the load may experience a voltage magnitude jump even if both the inverter and the grid output an alternating-current (AC) voltage at identical magnitudes and frequencies. Some loads may be sensitive to a sudden jump in the voltage magnitude of a power supply and load components may be damaged in event of a voltage jump. Grid 1028 may be similar to or the same as grid 108 of FIG. 1. The voltage of grid 1028 may be continuously sampled by voltmeter 1024, with voltmeter 1024 providing the samples to controller 1025. Controller 1025 may control the operation of PV inverter 1023. PV inverter 1023 may receive input power from photovoltaic (PV) source 1021. PV source 1021 may be similar to or the same as PV source 311 of FIG. 3. PV source 1021 and PV inverter 1023 may together comprise a generator similar to or the same as power generation system 101 of FIG. 1 or power generation system 301 of FIG. 3.

Upon receiving voltage samples from voltmeter 1024, controller 1025 may control the switching elements of inverter 1023 to track the voltage output by grid 1028. PV inverters may output a voltage according to a reference voltage signal, and by using the voltage of grid 1028 as a reference voltage signal for PV inverter 1023, synchronized voltage signals may be output by grid 1028 and PV inverter 1023. If synchronized voltage signals are provided, loads switched from grid 1028 to PV inverter 1023 or from PV inverter 1023 to grid 1028 might not be affected by the switching. Furthermore, synchronizing the output voltage of PV inverter 1023 and the output voltage of grid 1028 may facilitate coupling PV inverter 1023 to grid 1028, enabling PV inverter 1023 to inject power to grid 1028 (e.g. in return for "feed-in" payment).

In the illustrative embodiments disclosed herein, photovoltaic modules are used to exemplify energy sources which may make use of the novel features disclosed. In some embodiments, the energy sources may include solar shingles, batteries, wind or hydroelectric turbines, fuel cells, hydroelectric generators or other energy sources in addition to or instead of photovoltaic panels. The methods and features disclosed herein may be applied to alternative energy sources such as those listed above, and the mentioning of photovoltaic modules as energy sources is not intended to be limiting in this respect.

It is noted that various connections are set forth between elements herein. These connections are described in general and, unless specified otherwise, may be direct or indirect; this specification is not intended to be limiting in this respect. Further, elements of one embodiment may be combined with elements from other embodiments in appropriate combinations or subcombinations. For example, power generation system 101 of FIG. 1 may replace power generation system 300 of FIG. 3.

The invention claimed is:
1. An apparatus comprising:
a plurality of switches configured to receive power from a first electrical power source and a second electrical power source, wherein each switch comprises a plurality of throws, and wherein each throw comprises a transistor coupled in parallel to a electromechanical relay;
wherein the plurality of switches are configured to each connect to one of a plurality of electrical loads wherein each electrical load of the plurality of electrical loads is connectable via the plurality of throws of its corre- sponding switch to the first electrical power source or the second electrical power source; and a controller configured to control the plurality of throws to connect and disconnect one or more of the plurality of electrical loads to and from the first electrical power source and the second electrical power source, wherein the controller is configured to:

determine that power generated by the first electrical power source exceeds a power consumption of a first subset of the plurality of electrical loads connected to the first electrical power source by a first value, compare a power consumption of each electrical load of a second subset of the plurality of electrical loads connected to the second electrical power source to the first value, when the power consumption of the second subset of the plurality of electrical loads is less than the first value, operating the plurality of switches to disconnect the second subset from the second electrical power source and connect the second subset to the first electrical power source, and when the power consumption of each of the second subset of the plurality of electrical loads is greater than the first value, instruct a storage device to store excess power generated by the first electrical power source.

2. The apparatus of claim 1, wherein the plurality of throws maintain the first electrical power source and the second electrical power source in a disconnected state.

3. The apparatus of claim 1, wherein the storage device is configured to output power to one or more of the plurality of electrical loads.

4. The apparatus of claim 1, wherein the first electrical power source comprises a photovoltaic generator.

5. The apparatus of claim 3, further comprising an inverter connected between the first electrical power source and a first throw of the plurality of throws.

6. The apparatus of claim 5, further comprising a circuit breaker connected between the first electrical power source and the second electrical power source.

7. The apparatus of claim 1, wherein the second electrical power source comprises a utility electrical grid.

8. The apparatus of claim 1, wherein the controller is configured to control a first throw of the plurality of throws to disconnect a load from the first electrical power source before connecting the load to the second electrical power source.

9. The apparatus of claim 1, further comprising an enclosure, wherein the plurality of switches are incorporated in the enclosure.

10. The apparatus of claim 1, further comprising a communication device configured for transmitting power measurements to the controller.

11. The apparatus of claim 1, wherein to connect a disconnected load, each of the plurality of throws first connects the transistor, then while the transistor is connected connects the electromechanical relay, and then when the electromechanical relay is connected disconnects the transistor.

12. The apparatus of claim 1, wherein to disconnect a connected load, each of the plurality of throws first connects the transistor, then while the transistor is connected disconnects the electromechanical relay, and then when the electromechanical relay is disconnected disconnects the transistor.

13. A method comprising:

monitoring an electrical power output by a first electrical power source of a distribution system, wherein the distribution system further comprises:

a plurality of switches configured to receive power from the first electrical power source and a second electrical power source of the distribution system, wherein each switch comprises a plurality of throws, wherein each throw comprises a transistor coupled in parallel to an electromechanical relay, and wherein the plurality of switches are configured to each connect to one of a plurality of electrical loads of the distribution system, wherein each electrical load of the plurality of electrical loads is connectable via the plurality of throws of its corresponding switch to the first electrical power source or the second electrical power source;

monitoring an electrical power consumption of a first subset of the plurality of electrical loads, connected to the first electrical power source;

determining a first value that is a difference between the electrical power output by the first electrical power source and the electrical power consumption of the first subset of the plurality of electrical loads;

monitoring an electrical power consumption of a second subset of the plurality of electrical loads, connected to the second electrical power source;

comparing the power consumption of the second subset of the plurality of electrical loads to the first value;

when the power consumption of the second subset of the plurality of electrical loads exceeds the first value, instructing a storage device to store excess power generated by the first electrical power source; and when the power consumption of the second subset of the plurality of electrical loads is less than the first value, operating the plurality of switches to disconnect the second subset from the second electrical power source and connect the second subset to the first electrical power source.

14. The method of claim 13, wherein the first electrical power source comprises a photovoltaic generator.

15. The method of claim 13, wherein the second electrical power source comprises a utility electrical grid.

16. The method of claim 13, further comprising reducing the electrical power output generated by the first electrical power source when the storage device is fully charged.

17. The method of claim 13, further comprising controlling a first throw of the plurality of throws to disconnect a load from the second electrical power source before connecting the load to the first electrical power source.

18. The method of claim 13, wherein the plurality of switches are incorporated into a single device.

19. The method of claim 13, wherein to connect a disconnected load, each of the plurality of throws first connects the transistor, then while the transistor is connected connects the electromechanical relay, and then when the electromechanical relay is connected disconnects the transistor.

20. The method of claim 13, wherein to disconnect a connected load, each of the plurality of throws first connects the transistor, then while the transistor is connected disconnects the electromechanical relay, and then when the electromechanical relay is disconnected disconnects the transistor.

* * * * *